(12) United States Patent
Ciesielczyk et al.

(10) Patent No.: US 10,361,549 B2
(45) Date of Patent: Jul. 23, 2019

(54) HELICAL JUMPER CONNECTOR

(71) Applicant: Preformed Line Products Co., Mayfield Village, OH (US)

(72) Inventors: Benjamin Franklin Ciesielczyk, Madison, OH (US); Andrew James Hanneman, Mayfield Heights, OH (US); Mark Burns, Macedonia, OH (US)

(73) Assignee: Preformed Line Products Co., Mayfield Village, OH (US)

( * ) Notice: Subject to any disclaimer, the term of this patent is extended or adjusted under 35 U.S.C. 154(b) by 0 days.

(21) Appl. No.: 16/055,252

(22) Filed: Aug. 6, 2018

(65) Prior Publication Data

US 2019/0044315 A1 Feb. 7, 2019

Related U.S. Application Data

(60) Provisional application No. 62/541,290, filed on Aug. 4, 2017.

(51) Int. Cl.
| | |
|---|---|
| H02G 7/08 | (2006.01) |
| H01B 17/06 | (2006.01) |
| H02G 7/05 | (2006.01) |
| H01B 5/10 | (2006.01) |
| F16G 11/04 | (2006.01) |
| F16G 11/03 | (2006.01) |
| F16G 11/06 | (2006.01) |
| H02G 7/20 | (2006.01) |

(52) U.S. Cl.
CPC ............... *H02G 7/08* (2013.01); *F16G 11/03* (2013.01); *F16G 11/04* (2013.01); *F16G 11/06* (2013.01); *H01B 5/10* (2013.01); *H01B 17/06* (2013.01); *H02G 7/056* (2013.01); *H02G 7/205* (2013.01)

(58) Field of Classification Search
CPC .. H02G 7/08; H01B 5/10; H01B 17/06; F16G 11/04
USPC ........................................................ 439/245
See application file for complete search history.

(56) References Cited

U.S. PATENT DOCUMENTS

| | | | | |
|---|---|---|---|---|
| 4,849,596 | A | * 7/1989 | Riordan | ............... B23K 11/163 |
| | | | | 219/56.22 |
| 5,042,146 | A | * 8/1991 | Watson | ............... H01R 43/033 |
| | | | | 174/251 |

(Continued)

*Primary Examiner* — Alexander Gilman
(74) *Attorney, Agent, or Firm* — Cooper Legal Group, LLC

(57) ABSTRACT

A helical jumper connector includes a helical support member configured to support a wire. The helical support member includes a first leg having a first helical winding and a second leg having a second helical winding that defines a second axial opening. The first axial opening and the second axial opening are coaxial with the wire when the first helical winding and the second helical winding are wrapped around the wire and cooperatively engage with one another to support the wire. A jumper casting is configured to receive the helical support member. The helical support member and the jumper casting are electrically conductive such that the helical jumper connector forms an electrically conductive pathway to carry electrical current from the wire. A method of making a helical jumper connector assembly includes applying a compression force to a helical jumper connector comprising a helical support member received in a jumper casting.

20 Claims, 18 Drawing Sheets

(56) References Cited

U.S. PATENT DOCUMENTS

| | | | | | |
|---|---|---|---|---|---|
| 5,059,143 | A | * | 10/1991 | Grabbe | H01R 13/187 439/840 |
| 5,470,256 | A | * | 11/1995 | Waldock | B65H 75/36 102/202.12 |
| 6,159,055 | A | * | 12/2000 | Satitpunwaycha | H01L 21/6833 439/700 |
| 6,525,265 | B1 | * | 2/2003 | Leijon | H01R 4/68 174/15.5 |
| 6,648,279 | B1 | * | 11/2003 | Malin | H02G 7/053 174/44 |
| 7,200,930 | B2 | * | 4/2007 | Khandros | B23K 20/004 29/860 |
| 7,384,271 | B1 | * | 6/2008 | Mickievicz | H01R 12/714 439/66 |
| 7,413,153 | B1 | * | 8/2008 | Ghormley | F16L 3/085 174/172 |
| 8,974,401 | B2 | * | 3/2015 | Taylor | A61M 25/002 600/585 |
| 10,106,369 | B2 | * | 10/2018 | Makrinos | B65H 75/36 |

* cited by examiner

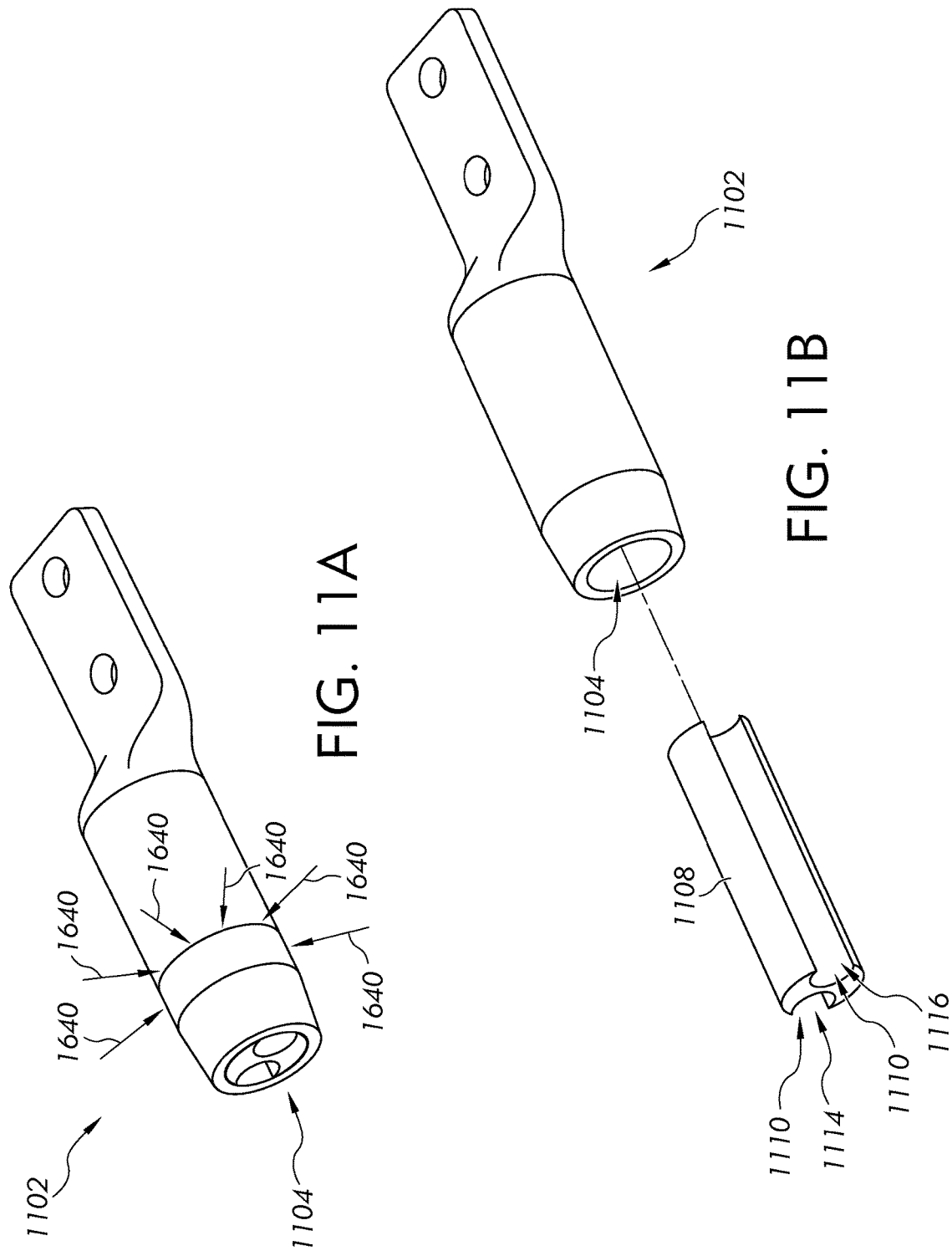

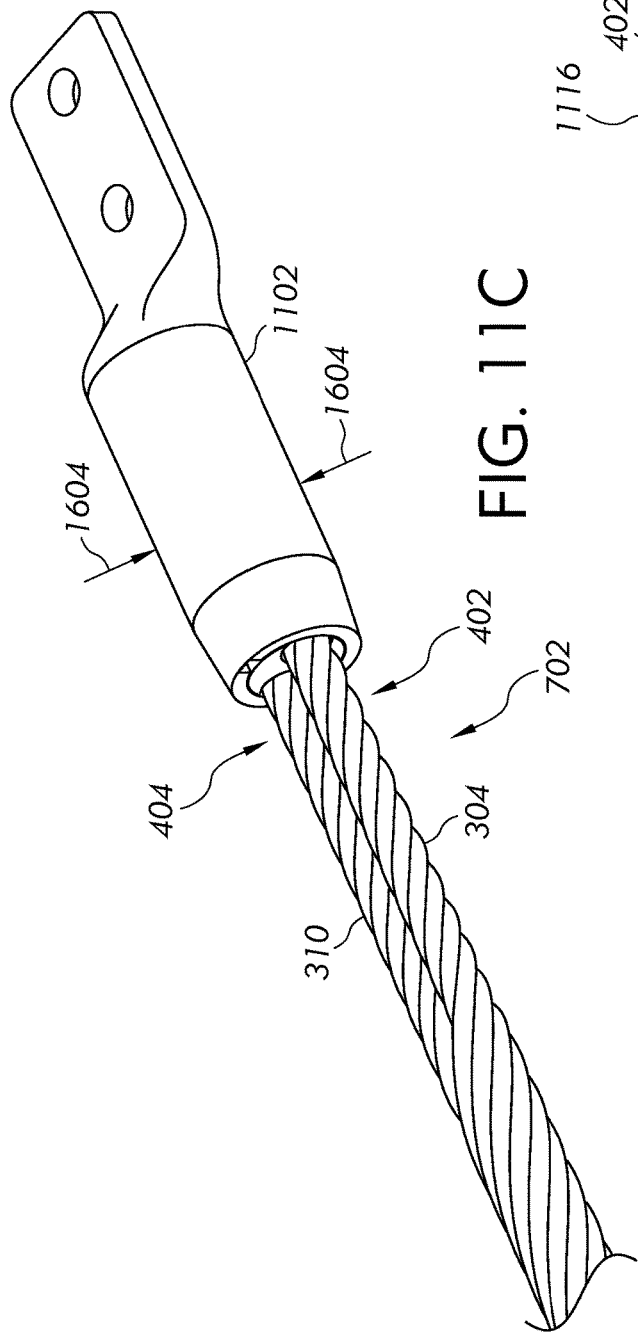
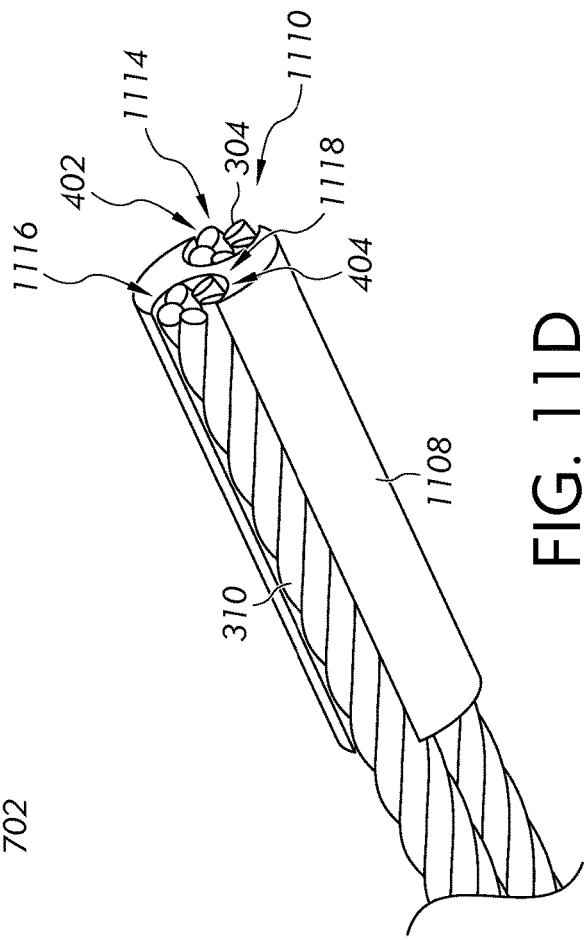

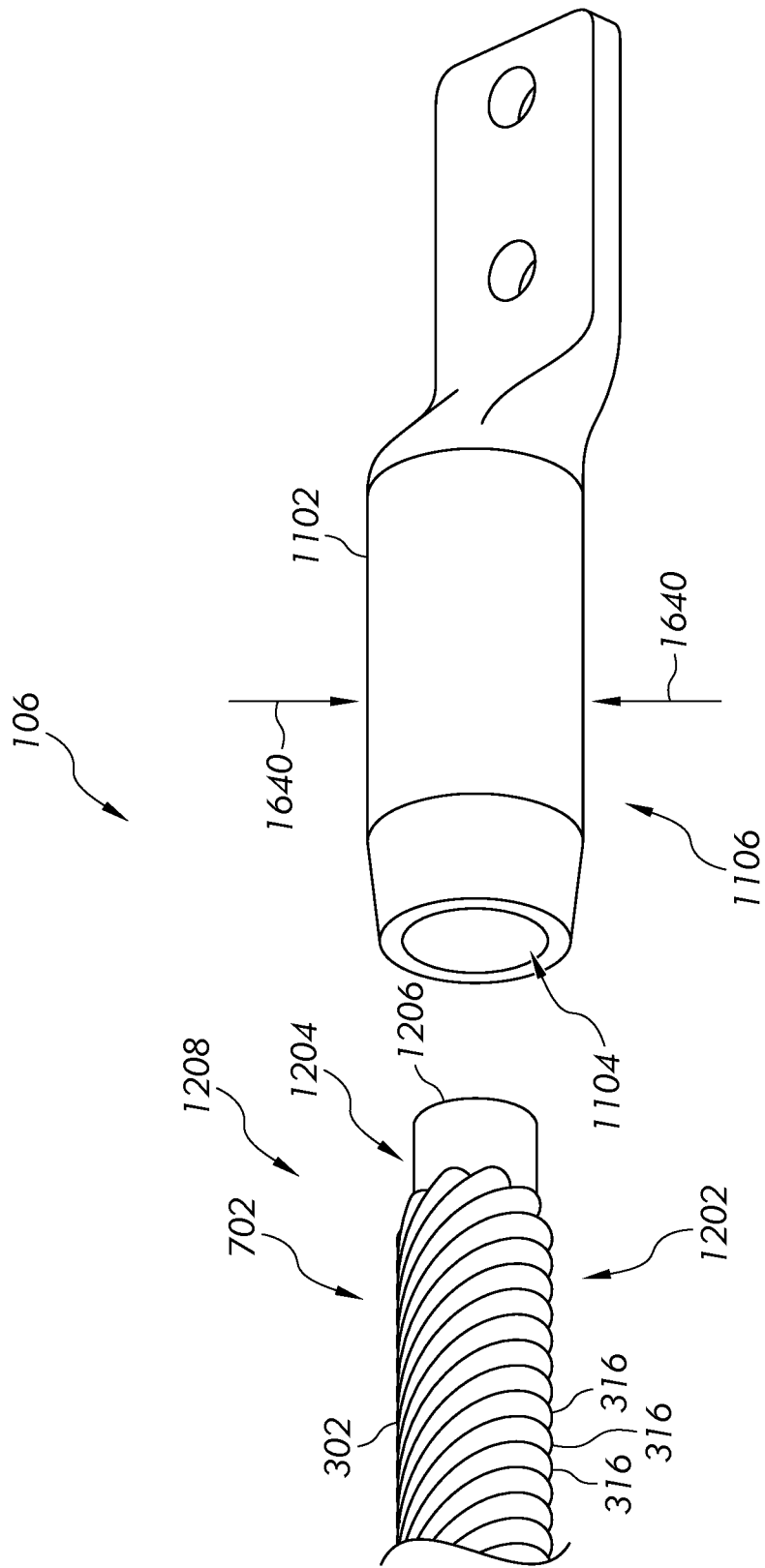

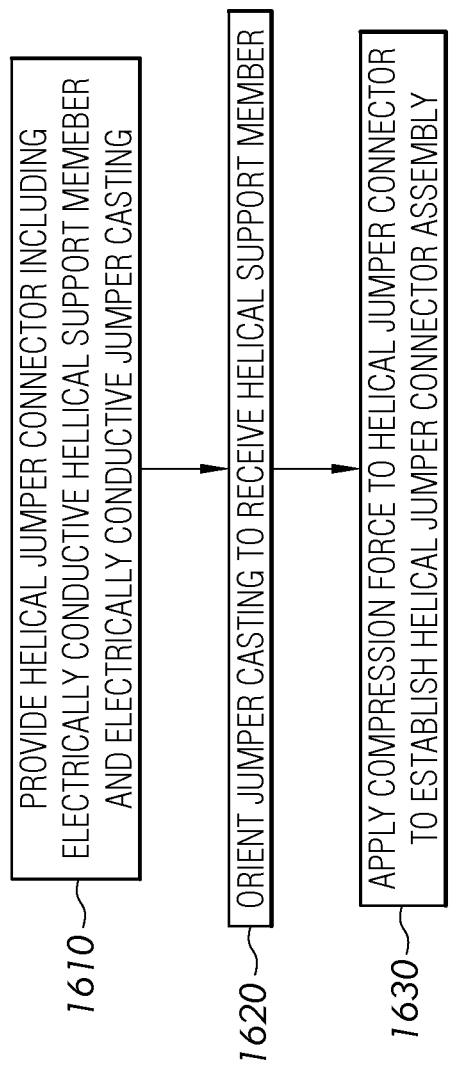

HELICAL JUMPER CONNECTOR

CROSS-REFERENCE TO RELATED APPLICATIONS

This application claims priority to U.S. Provisional Patent Application No. 62/541,290, filed on Aug. 4, 2017, the entire disclosure of which is hereby incorporated by reference.

TECHNICAL FIELD

The instant application is directed towards a support structure. For example, the instant application is directed towards a helical jumper connector that acts as a support structure for supporting a cable or conductive wire.

BACKGROUND

Support structures can be used for supporting a cable, a wire, or the like. The support structure can be at least partially wound around the cable, wire, etc.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

In an example, a helical jumper connector including a helical support member configured to support a wire. The helical support member includes a first leg having a first helical winding that defines a first axial opening. The helical support member also includes a second leg having a second helical winding that defines a second axial opening. The first axial opening and the second axial opening are coaxial with the wire when the first helical winding and the second helical winding are wrapped around the wire and cooperatively engage with one another to support the wire. The helical jumper connector also includes a jumper casting configured to receive the helical support member. The helical support member is electrically conductive and the jumper casting is electrically conductive such that the helical jumper connector forms an electrically conductive pathway to carry electrical current from the wire.

In an example, a method of making a helical jumper connector assembly including providing a helical jumper connector. The helical jumper connector includes a helical support member configured to support a wire, the helical support member includes a first leg having a first helical winding that defines a first axial opening. The helical support member also includes a second leg having a second helical winding that defines a second axial opening. The first axial opening and the second axial opening are coaxial with the wire when the first helical winding and the second helical winding are wrapped around the wire and cooperatively engage with one another to support the wire. The helical jumper connector also includes a jumper casting configured to receive the helical support member. The helical support member is electrically conductive and the jumper casting is electrically conductive such that the helical jumper connector forms an electrically conductive pathway to carry electrical current from the wire. The method also includes orienting the jumper casting to receive the helical support member. The method further includes applying a compression force to the helical jumper connector to establish a helical jumper connector assembly.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 11A is an illustration of an example helical jumper connector;

FIG. 11B is an illustration of an example helical jumper connector;

FIG. 11C is an illustration of an example helical jumper connector;

FIG. 11D is an illustration of an example helical jumper connector;

FIG. 12 is an illustration of an example helical jumper connector;

FIG. 16 is a top-down flow chart describing a method.

DETAILED DESCRIPTION

Figure 1:
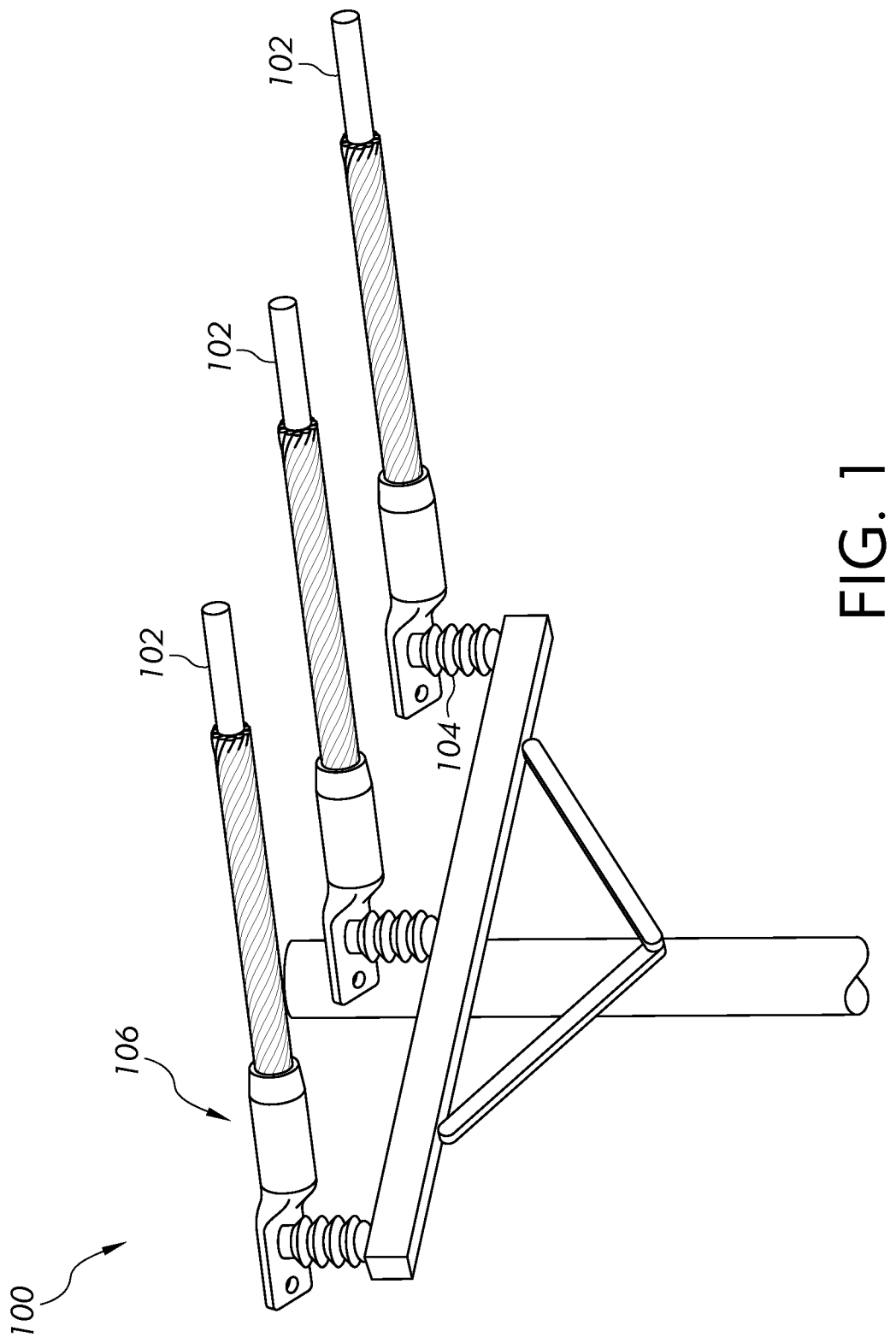
FIG. 1 is an illustration of an example helical jumper connector.

The following disclosure provides many different embodiments, or examples, for implementing different features of the provided subject matter. Specific examples of components and arrangements are described below to simplify the present disclosure. These are, of course, merely examples and are not intended to be limiting. For example, the attachment of a first feature and a second feature in the description that follows may include embodiments in which the first feature and the second feature are attached in direct contact, and may also include embodiments in which additional features may be positioned between the first feature and the second feature, such that the first feature and the second feature may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Turning to FIG. 1, an example overhead power line environment 100 is illustrated. The overhead power line environment 100 comprises any number of structures, configurations, constructions, etc., some of which may be described and/or illustrated with respect to FIGS. 1 to 15. In an example, the overhead power line environment 100 may be used in association with electric power transmission and/or distribution. One or more conductors may be suspended by a tower, pole, or the like.

The overhead power line environment 100 comprises a wire 102. In some examples, the wire 102 is an electrically conductive wire that may transmit electrical energy through the wire 102. The wire 102 (e.g., a power line, a conductor, etc.) may comprise a metal material that is electrically conductive. For example, the wire 102 can comprise materials including, but not limited to, aluminum or copper. The wire 102 may extend between towers, poles, or the like and, in the illustrated example, may be supported at a distance above the ground (e.g., overhead).

The overhead power line environment 100 comprises an attachment structure 104. It will be appreciated that the example of FIG. 1 illustrates an exemplary attachment structure 104. However, in other examples, the attachment structure 104 is not limited to the illustrated size, shape, construction, design, etc. Rather, the attachment structure 104 comprises any number of constructions, some of which may be used to support a structure (e.g., the wire 102, etc.) at a distance above the ground with respect to a tower, pole, or the like. The attachment structure 104 may comprise a gripping portion, one or more fasteners, etc. The attachment structure 104 may be directly or indirectly attached to a tower, pole, or the like.

The overhead power line environment 100 includes a helical jumper connector 106 for supporting the wire 102. As will be described herein, the helical jumper connector 106 may be applied over an outer surface of the wire 102, such that the helical jumper connector 106 may provide radial compression to the wire 102. As such, the helical jumper connector 106 may support (e.g., hold, grip, etc.) the wire 102 and maintain a tension in the wire 102 without damaging the wire 102. With the helical jumper connector 106 supporting the wire 102, the wire 102 may pass over a structure (e.g., as illustrated), pass around a structure, bypass a structure, attach to a structure, terminate, etc. For the sake of simplicity and clarity, FIG. 1 does not show fasteners or other connections for the continuation of a conducting wire at termination ends of the helical jumper connector 106. It is to be understood that another jumper connector can attach to the helical jumper connector 106 shown.

Figure 2:
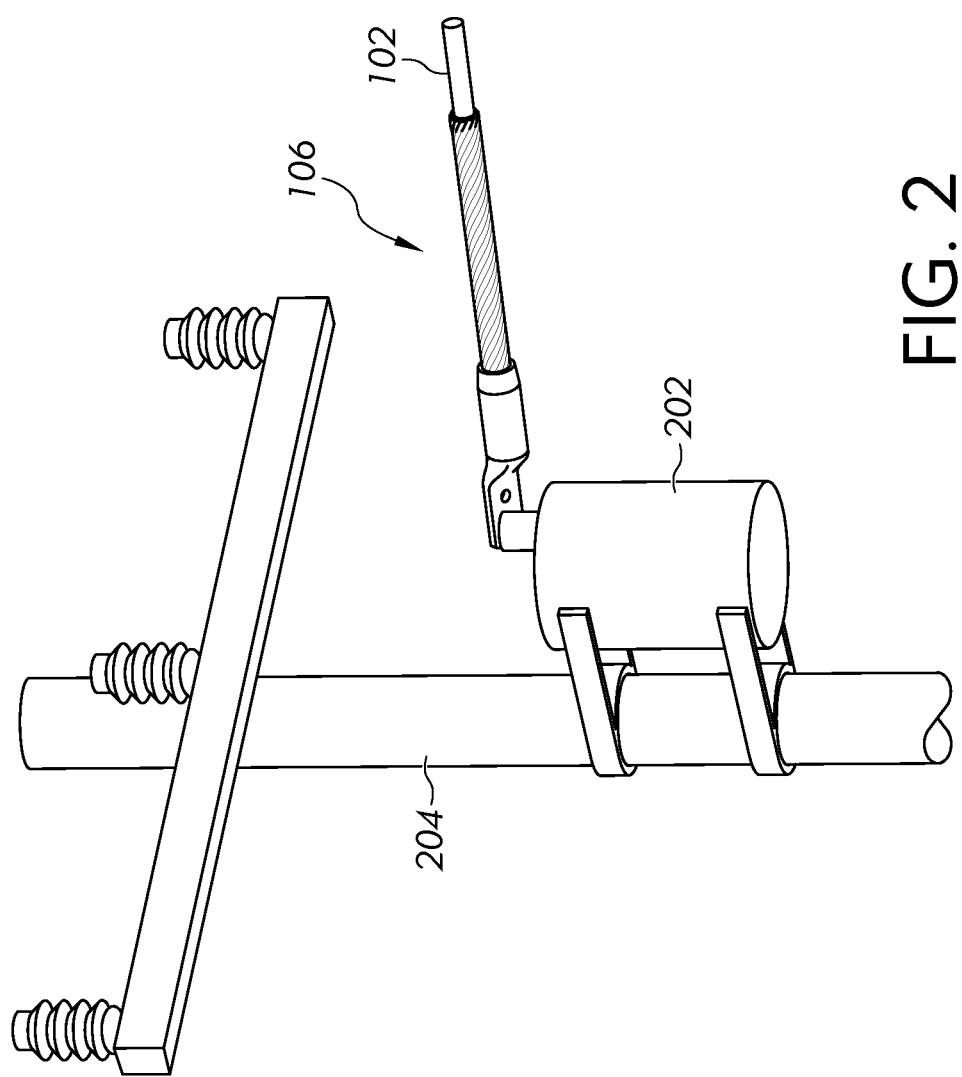
FIG. 2 is an illustration of an example helical jumper connector.

Turning to FIG. 2, the helical jumper connector 106 is illustrated supporting the wire 102 while being attached to a piece of electrical equipment. In the shown example, the helical jumper connector 106 is attached to a transformer 202 that is, in turn, supported above the ground by a support structure 204 which can be a tower, pole, or the like. Similar to FIG. 1, FIG. 2 does not show fasteners or other connections for the helical jumper connector 106 to attach to the transformer 202.

Figure 3:
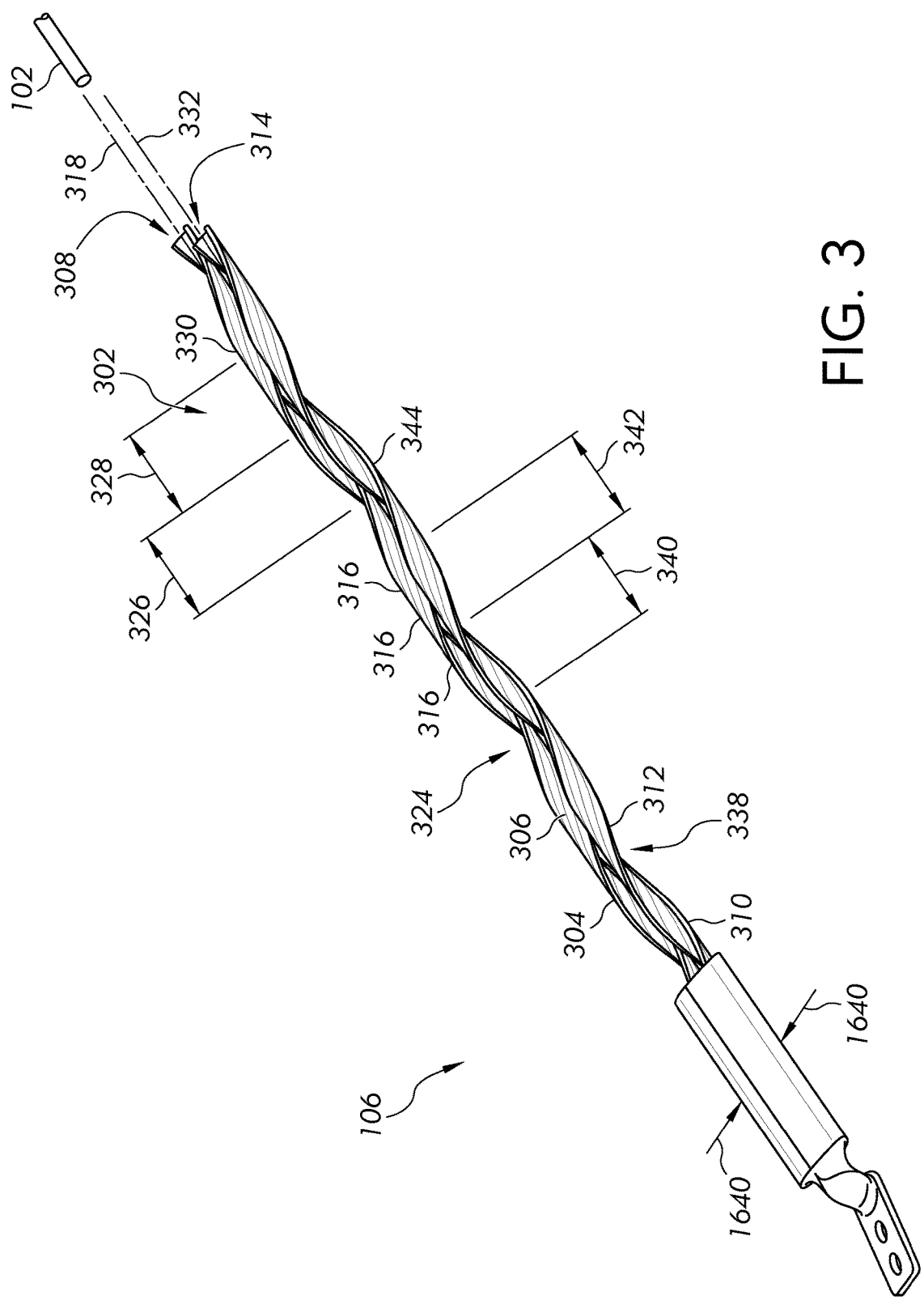
FIG. 3 is an illustration of an example helical jumper connector.

Turning to FIG. 3, the helical jumper connector 106 is illustrated in association with the wire 102. It will be appreciated that in the illustrated example, a portion of the wire 102 is illustrated. In operation, however, the wire 102 may extend a longer or shorter distance than as illustrated, such as by extending in a similar manner as illustrated in FIG. 1. The helical jumper connector 106 includes a helical support member 302 configured to support the wire 102. The helical support member 302 includes a first leg 304 having a first helical winding 306 that defines a first axial opening 308. The helical jumper connector 106 also includes a second leg 310 having a second helical winding 312 that defines a second axial opening 314. The first helical winding 306 and the second helical winding 312 can be constructed in any suitable manner with various materials. In the shown examples, the first helical winding 306 and the second helical winding 312 consist of individual strands 316. In an example, the strands 316 comprise a relatively rigid material that provides at least some degree of rigidity, inflexibility, strength, support, etc. In some examples, the strands 316 comprise a metal material. The strands 316 are electrically conductive such that the strands 316 are capable of transmitting electrical power transferred from the wire 102.

Focusing upon the first leg 304, the first leg 304 may extend substantially linearly along a first support axis 318. The first leg 304 may have a first helical winding 306 that defines a first axial opening 308. The first helical winding 306 may helically wind about the first support axis 318. The first helical winding 306 defines one or more first spaces 324 disposed between neighboring helical winds. In an example, a dimension 326 (e.g., a length and/or a width) of the first spaces 324 may substantially match a dimension 328 (e.g., a length and/or a width) of the first helical winds 330 of the first helical winding 306.

Focusing on the second leg 310, the second leg 310 can extend along a second support axis 332. The second helical winding 312 may helically wind about the second support axis 332. The second helical winding 312 defines one or more second spaces 338 disposed between neighboring helical winds. In an example, a dimension 340 (e.g., a length and/or a width) of the second spaces 338 may substantially match a dimension 342 (e.g., a length and/or a width) of the second helical winds 344 of the second helical winding 312.

Figure 4A:
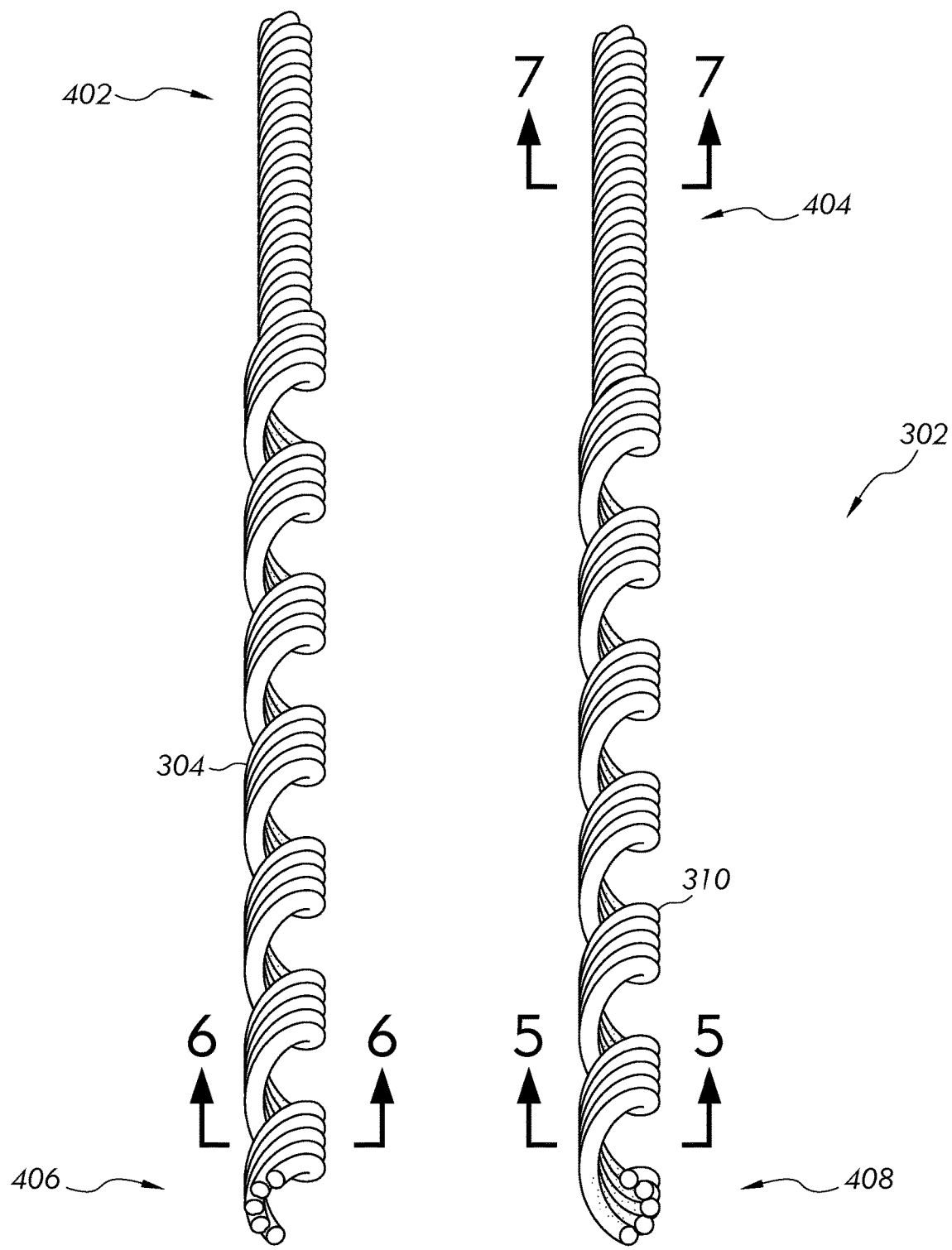
FIG. 4A is an illustration of an example helical jumper connector.
Figure 4B:
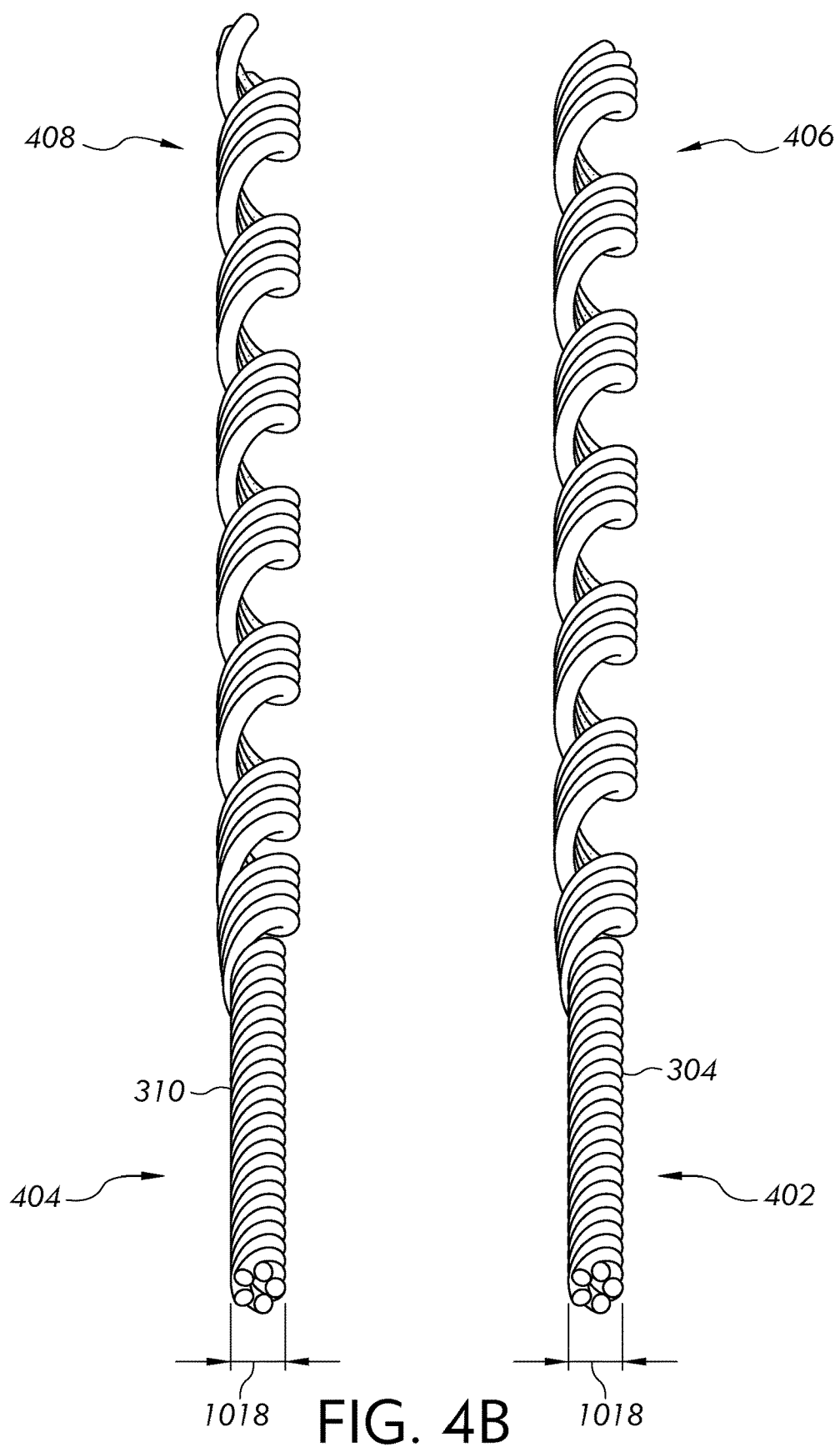
FIG. 4B is an illustration of an example helical jumper connector.
Figure 4C:
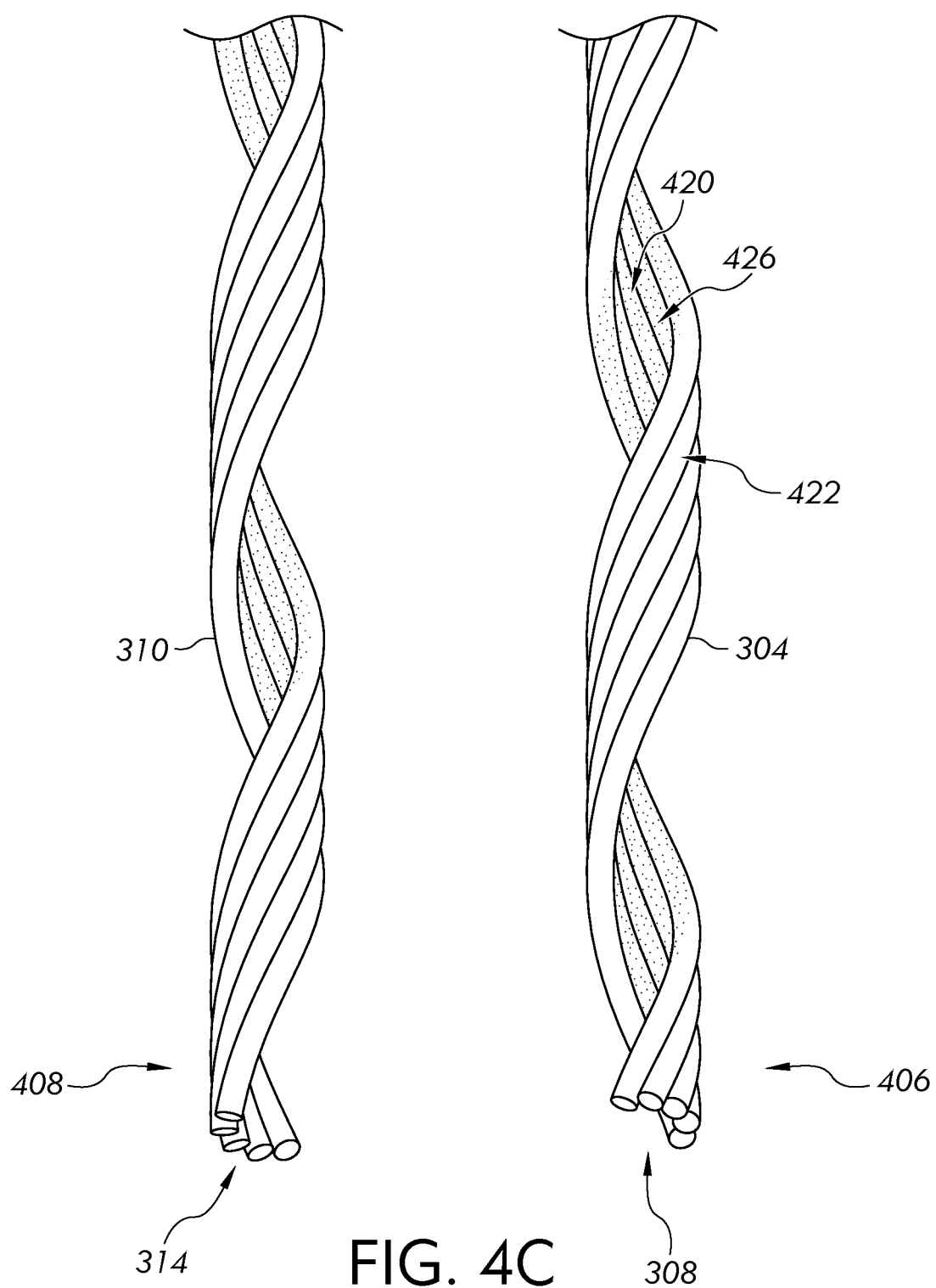
FIG. 4C is an illustration of an example helical jumper connector.

Turning to FIG. 4A, the helical support member 302 can include the first leg 304 and the second leg 310 that are separated from one another. For example, the first leg 304 and the second leg 310 do not necessarily require construction from single pieces of material. Additionally, the first leg 304 and the second leg 310 do not necessarily have to be joined together prior to an assembly operation that will be described below. As shown in FIG. 4B, a first end 402 of the first leg 304 can be cabled. Additionally, a first end 404 of the second leg 310 can be cabled. Returning to FIG. 4A, the first end 402 of the first leg 304 is located at the opposing end from a second end 406 of the first leg 304. Similarly, the first end 404 of the second leg 310 is located at the opposing end from a second end 408 of the second leg 310. Turning to FIG. 4C, the second end 406 of the first leg 304 defines the first axial opening 308. The second end 408 of the second leg 310 defines the second axial opening 314.

For the purposes of this disclosure, the term "cabled" is intended to mean that individual wire strands are close packed such that the winding does not include spaces disposed between neighboring winds. In other words, there is a relatively continuous exterior surface that does not have spaces wider than the diameter of a strand 316. The term "cabled" can also be interpreted as the individual wire strands are wound around one another such that there is not an axial opening within the intertwined wire strands such as the first axial opening 308 and the second axial opening 314.

Remaining with FIG. 4C, the first helical winding 306 includes a first inwardly facing surface 420, which faces towards the first axial opening 308. The first helical winding 306 also includes, a first outwardly facing surface 422, which faces away from the first axial opening 308. In an example, the first inwardly facing surface 420 has a coefficient of friction different than a coefficient of friction of the first outwardly facing surface 422.

In an example, the first helical winding 306 comprises a first friction facilitating portion 426. The first friction facilitating portion 426 may be disposed on some or all of a surface of the first helical winding 306. For example, the first friction facilitating portion 426 may be disposed on the first inwardly facing surface 420 of the first helical winding 306, such that the first friction facilitating portion 426 may face towards and/or come into contact with the wire 102. In an example, the first friction facilitating portion 426 may define an increased surface roughness of the first helical winding 306 as compared to portions of the first helical winding 306 that do not have the first friction facilitating portion 426 (e.g., the first outwardly facing surface 422). In some examples, the first friction facilitating portion 426 defines a relatively increased roughness, unevenness, irregular, etc. portion of the first helical winding 306 as compared to portions of the first helical winding 306 (e.g., the first outwardly facing surface 422) that do not have the first friction facilitating portion 426.

In some examples, the first friction facilitating portion 426 comprises a material that may be separately attached to the first inwardly facing surface 420 of the first helical winding 306. For example, the first friction facilitating portion 426 may comprise grit, sand, or other fine particulate materials that may be attached (e.g., adhered, glued, etc.) to the first inwardly facing surface 420 of the first helical winding 306. In some examples, the first friction facilitating portion 426 can be electrically conductive.

Figure 5:
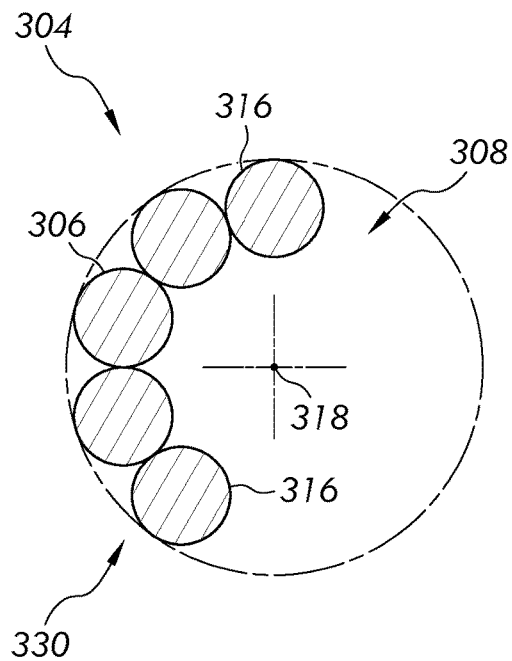
FIG. 5 is an illustration of an example helical jumper connector.

Turning to FIG. 5, a sectional view of the first leg 304 as viewed from the perspective indicated by line 5-5 of FIG. 4A is illustrated. In this example, the first leg 304 has the first helical winding 306 that defines the first axial opening 308. The first axial opening 308 extends along the first support axis 318 and is defined within the first spaces 324 and the first helical winds 330 of the first helical winding 306. In this example, the first axial opening 308 (e.g., defined within the first helical winding 306) has a cross-sectional size (e.g., diameter) that is less than or equal to a cross-sectional size (e.g., diameter) of the wire 102. As such, the wire 102 may be tightly received at least partially within the first axial opening 308.

It will be appreciated that in the illustrated example of FIG. 5, the strands 316 (e.g., the first helical winding 306) are illustrated along a lateral side (e.g., the left side) of the first axial opening 308. However, the strands 316 are not limited to such a position. Indeed, due to the location of the cross-section (e.g., as illustrated in FIG. 4), the strands 316 are positioned along the lateral side (e.g., the left side) at that particular cross-section. Due to the strands 316 (e.g., the first helical winding 306) helically winding about the first support axis 318, at other cross-sectional locations, the strands 316 (e.g., the first helical winding 306) may be positioned along a top side, bottom side, opposing lateral side (e.g., the right side), etc. with respect to the first axial opening 308.

Figure 6:
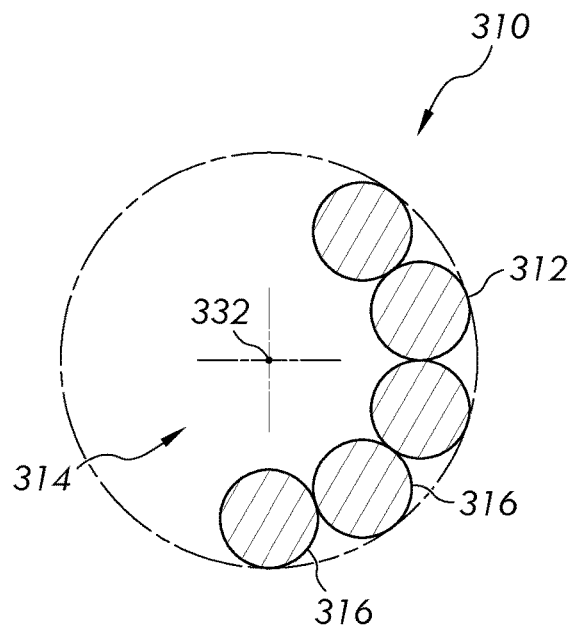
FIG. 6 is an illustration of an example helical jumper connector.

Turning to FIG. 6, a sectional view of the second leg 310 as viewed from the perspective indicated by line 6-6 of FIG. 4A is illustrated. In this example, the second leg 310 has the second helical winding 312 that defines the second axial opening 314. The second axial opening 314 extends along the second support axis 332 and is defined within the second spaces 338 and the second helical winds 344 of the second helical winding 312. In this example, the second axial opening 314 has a cross-sectional size (e.g., diameter) that is less than or equal to a cross-sectional size (e.g., diameter) of the wire 102. As such, the wire 102 may be tightly received within the second axial opening 314.

It will be appreciated that in the illustrated example of FIG. 6, the strands 316 (e.g., the second helical winding 312) are illustrated along a lateral side (e.g., the right side) of the second axial opening 314. However, the strands 316 are not limited to such a position. Indeed, due to the location of the cross-section (e.g., as illustrated in FIG. 4), the strands 316 are positioned along the lateral side (e.g., the right side) at that particular cross-section. Due to the strands 316 (e.g., the second helical winding 312) helically winding about the second support axis 332, at other cross-sectional locations, the strands 316 (e.g., the second helical winding 312) may be positioned along a top side, bottom side, opposing lateral side (e.g., the left side), etc. with respect to the second axial opening 314.

Figure 7:
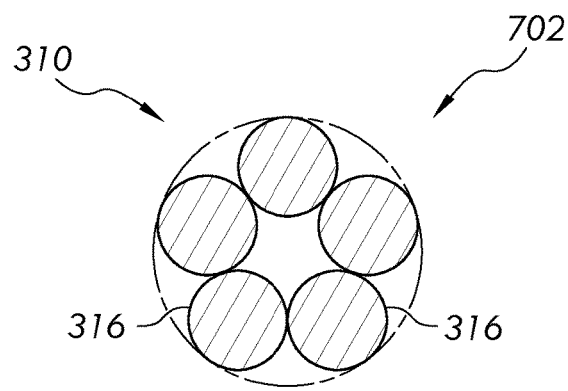
FIG. 7 is an illustration of an example helical jumper connector.

Turning to FIG. 7, a sectional view of the second leg 310 as viewed from the perspective indicated by line 7-7 of FIG. 4A is illustrated. As noted previously, a portion 702 of the helical support member 302 can be cabled. FIG. 7 illustrates the cabled strands 316 wound around one another such that a minimal axial opening or no appreciable axial opening is present within/between the strands 316. It is to be understood that the portion 702 of the helical support member 302 shown here is located at the first end 402 of the first leg 304. The first end 404 of the second leg 310 can be cabled in a similar way or in the same way as the first end 402 of the first leg 304. The example of FIG. 7 shows five strands 316, however, other amounts of strands are also contemplated. Additional non-limiting examples of helical support members 302 having cabled portions at different locations and/or in different arrangements are described in the following two paragraphs.

Figure 8:
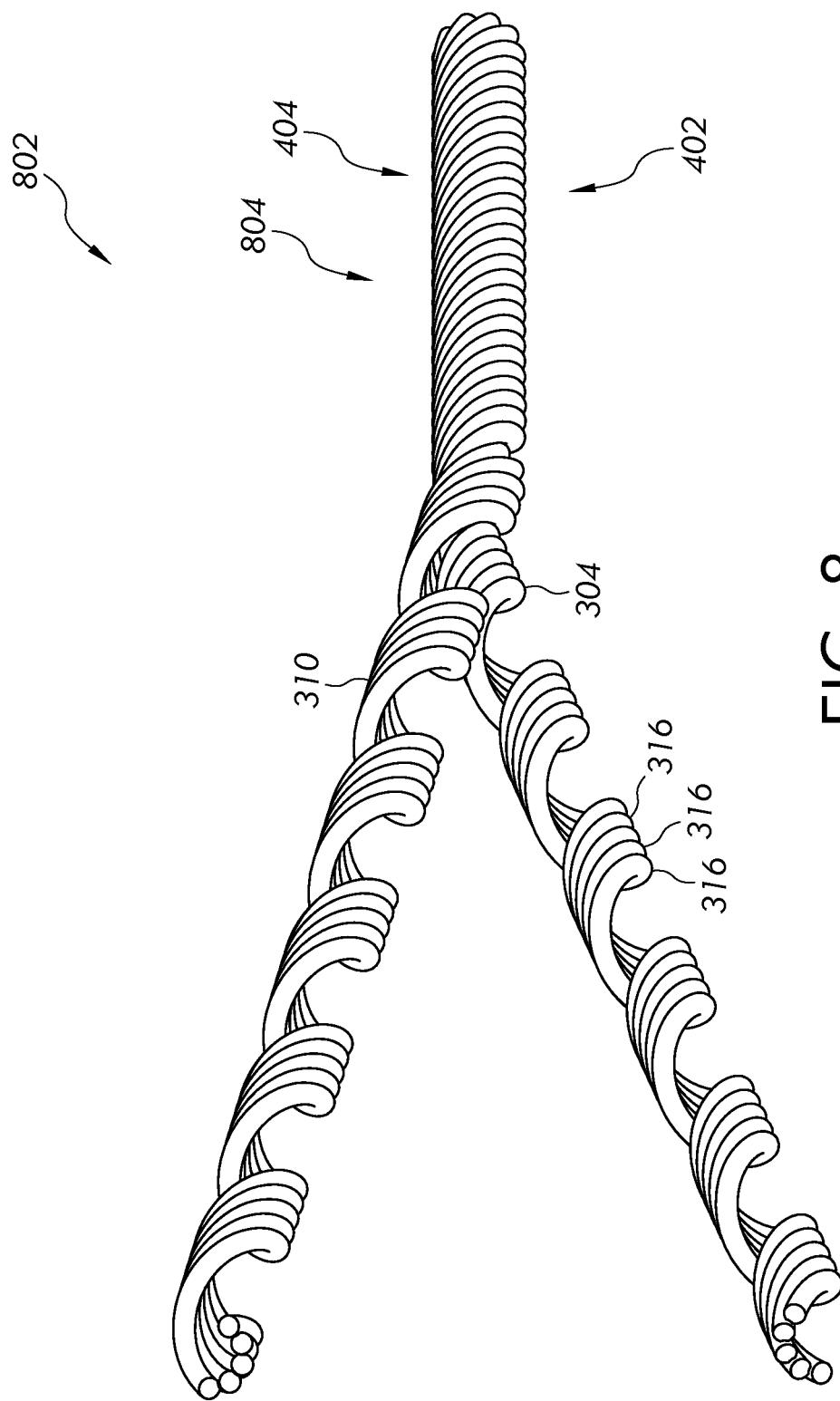
FIG. 8 is an illustration of an example helical jumper connector.

Turning to FIG. 8, an example helical support member 802 is illustrated. In this example, similar to the example shown in FIG. 4, first end 402 of the first leg 304 and the first end 404 of the second leg 310 are cabled. However, in this example, first end 402 of the first leg 304 and the first end 404 of the second leg 310 are cabled together such that the strands 316 of the first leg 304 and the strands 316 of the second leg 310 are cabled together. This essentially creates a one-piece helical support member 802 that is attached at portion 804.

Figure 9:
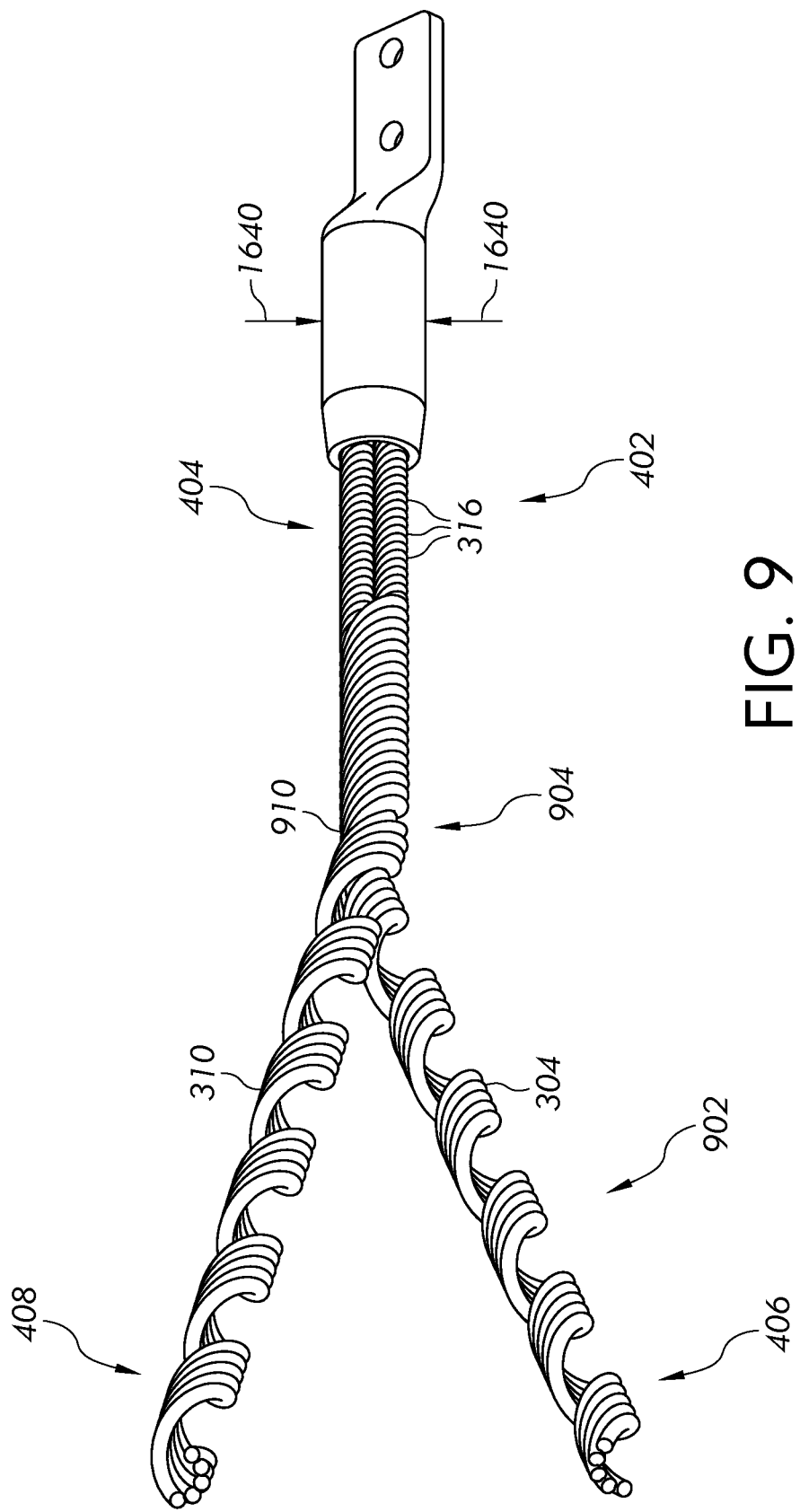
FIG. 9 is an illustration of an example helical jumper connector.

Turning to FIG. 9, an example helical support member 902 is illustrated. In this example, a portion 904 of the helical support member 902 is cabled, and the portion 904 is located between the first end 402 and the second end 406 of the first leg 304. The portion 904 is also located between the first end 404 and the second end 408 of the second leg 310. At portion 904, the strands 316 of the first leg 304 and the strands 316 of the second leg 310 are cabled together. In addition to the cabling of the combined strands 316 of the first leg 304 and the second leg 310 at portion 904, other portions of the helical support member 902 can also be cabled. For example, the first end 402 of the first leg 304 can be cabled using the strands 316 of the first leg 304. Similarly, the first end 404 of the second leg 310 can be cabled using the strands 316 of the second leg 310. In some examples, a marking 910 can be placed on the second helical winding 312 in order to mark a placement location for an end of the wire 102 during the helical jumper connector 106 installation in the field. The location is predetermined such that a suitable friction force is developed between the second leg 310 and the wire 102 at installation in order to support the wire 102 above a surface.

As can be understood from the previously described examples of the helical support member 302, 802, 902, various arrangements of helical portions and non-helical portions (e.g., cabled portions) can be provided. In some examples, the first leg 304 is separate from the second leg 310 while in other examples, the first leg 304 is connected to the second leg 310.

The helical support member 302, 802, 902 can be manufactured in any suitable manner. In an example, the helical support member 302, 802, 902 can be manufactured using a numerically controlled spring making machine. The helical portions can be formed in which many of the parameters can be varied simultaneously to optimize the design. In particular, pitch and/or compression ratio can be properly designed/engineered and then this information is provided to spring making machines. The use of a numerically controlled spring making machine to manufacture the helical support member 302, 802, 902 will allow gradual and non-symmetrical changes to occur to the pitch angle and pitch length and the compression ratio if necessary. Alternatively, the helical support member 302, 802, 902 can be manufactured using a rotating mandrel with a fixed or varying feed rate.

Figure 10A:
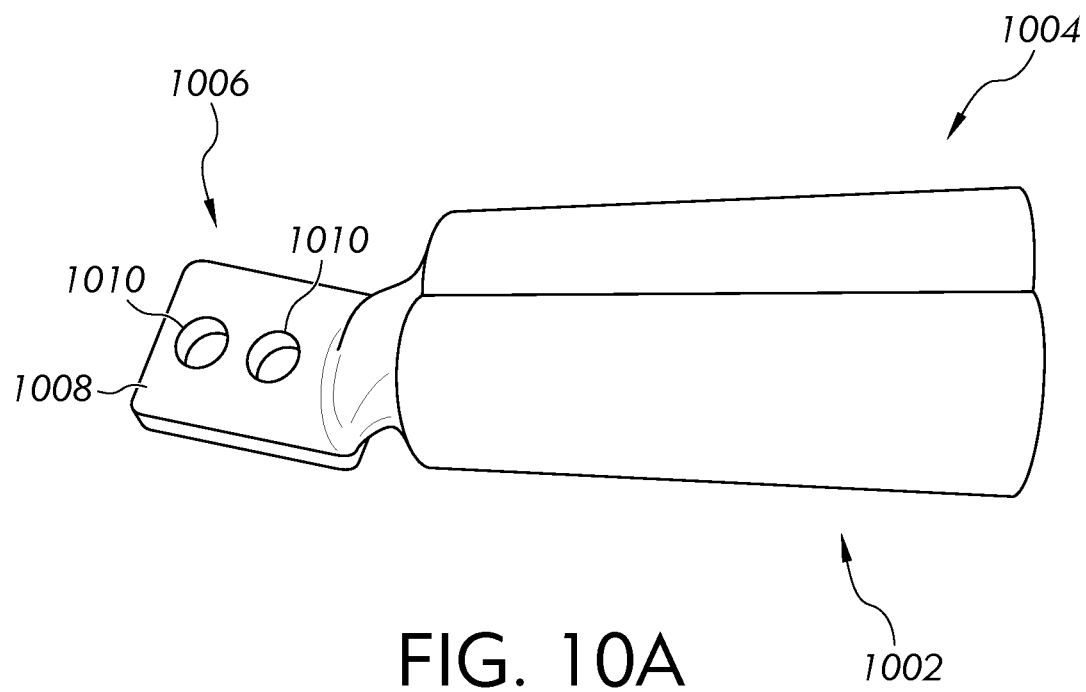
FIG. 10A is an illustration of an example helical jumper connector.

Turning to FIG. 10A, an example jumper casting 1002 is illustrated. It is to be appreciated that "jumper casting" as used herein is meant to refer to a formed component that is not limited to a casting. A jumper casting could thus be manufactured in a variety of ways (e.g., extrusion, casting, and/or machining, etc.). The jumper casting 1002 is configured to receive the helical support member 302, 802, 902. In an example, the jumper casting 1002 extends between a first casting end 1004 and a second casting end 1006. In an example, the second casting end 1006 is a mounting flange 1008. The mounting flange 1008 can be of any suitable size or shape and is configured to enable attachment of the helical jumper connector 106 to another structure. Some examples of another structure can include, but are not limited to, another helical jumper connector in order to maintain a transmission or distribution line of electrical power, a piece of electrical equipment such as a transformer, or mounting structures on a pole, tower, or the like to suspend a wire 102 above the ground. The mounting flange 1008 can define one or more apertures 1010 that can be used to attach the jumper casting 1002 to another structure with relative ease using standard attachment devices such as threaded fasteners, clips, clamps, etc. In an example, the apertures 1010 are arranged in a standard mounting pattern for equipment of this type such as insulators, transformers, attachment equipment located on poles and/or towers, etc.

Figure 10B:
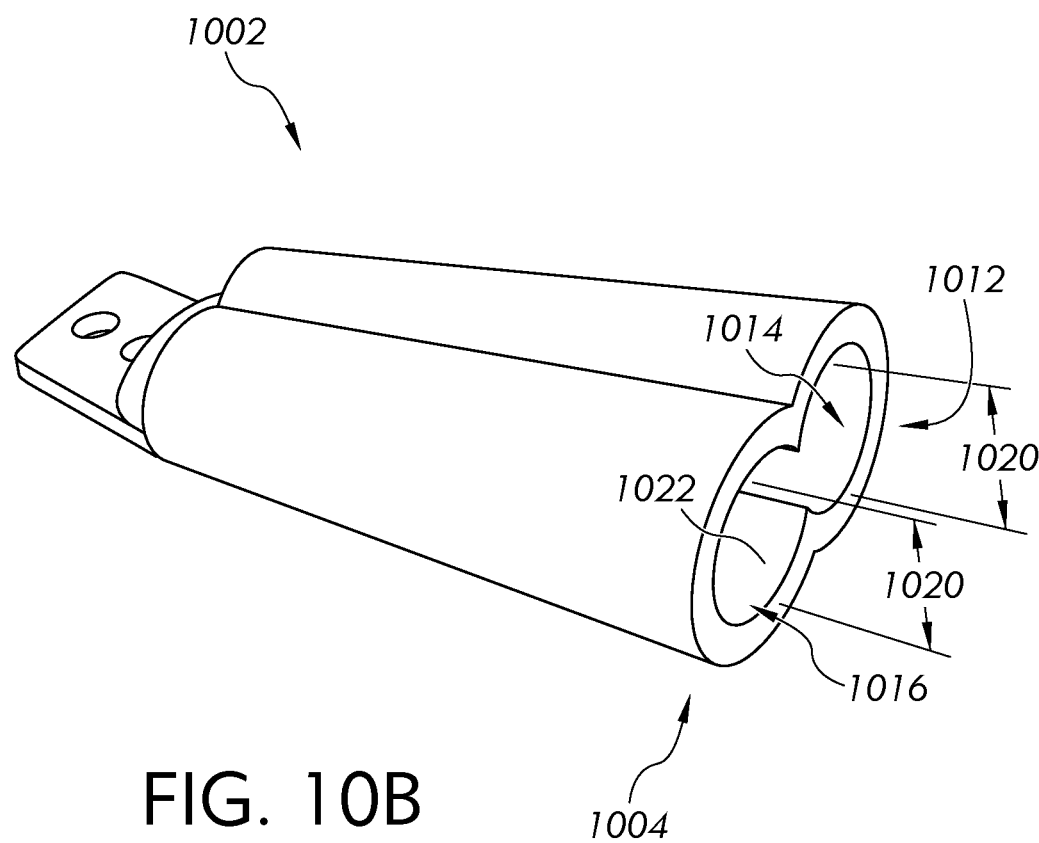
FIG. 10B is an illustration of an example helical jumper connector.

Turning to FIG. 10B, the jumper casting 1002 defines an aperture 1012 at the first casting end 1004 configured to receive the helical support member 302. The aperture 1012 of the example jumper casting 1002 includes a first cavity 1014 and a second cavity 1016. In the shown example, the first cavity 1014 and the second cavity 1016 are parallel cavities on the first casting end 1004 that enable one helically formed leg to be inserted into each cavity. For example, the first cavity 1014 is configured to receive the first end 402 of the first leg 304 and the second cavity 1016 is configured to receive the first end 404 of the second leg 310. As noted previously, the first end 402 of the first leg 304 and the first end 404 of the second leg 310 can be cabled such that the jumper casting 1002 receives the cabled first ends 402, 404 (e.g., the cabled portion 702) of the helical support member 302.

In an example, an exterior dimension 1018 (e.g., outside diameter) (best seen in FIG. 4B) of each first end 402, 404 is equal to or slightly less than an interior dimension 1020 of its respective cavity 1014, 1016. With this relationship between the exterior dimension 1018 and the interior dimension 1020, a relatively snug fit can be fostered between the first ends 402, 404 and their respective cavities 1014, 1016.

In an example, an inner sidewall 1022 of the jumper casting 1002 defines the aperture 1012. In an example, the inner sidewall 1022 can be interrupted or incomplete such that the first cavity 1014 is in fluid communication with the second cavity 1016. In other words, the aperture 1012 can resemble a figure-8 with the center portion being open to both lobes of the figure-8.

Additionally, the jumper casting 1002 can be manufactured by any suitable process with various materials. While the term "jumper casting" is used, it is not required that the jumper casting 1002 be manufactured by a casting process using molten metal to form the final piece. The jumper casting 1002 is electrically conductive such that the helical jumper connector 106 forms an electrically conductive pathway to carry electrical current from the wire 102. In other words, electrical current is transferred from the wire 102, through the helical support member 302, 802, 902, and then through the jumper casting 1002 to another structure or piece of equipment as noted previously.

Turning to FIG. 11A, an example jumper casting 1102 is illustrated having a single aperture 1104 at the first casting end 1106 such that the aperture 1104 includes a single cavity rather than two cavities as does aperture 1012. The jumper casting 1102 is similar to the jumper casting 1002 of FIGS. 10A and 10B in most respects save for the difference in the configuration of the aperture 1104 versus the aperture 1012. As further shown in FIG. 11B, an example of the helical jumper connector 106 includes an insert 1108. The insert 1108 can be constructed of any suitable material by any suitable process. In an example, the insert 1108 is extruded. In an example, the insert 1108 is electrically conductive. The aperture 1104 defined by the jumper casting 1102 is configured to receive the insert 1108, and the insert 1108 defines an insert aperture 1110. The insert aperture 1110 is configured to receive the helical support member 302 (e.g., the cabled portion 702).

Turning to FIG. 11C, in an example, the portion 702 comprises the first end 402 of the first leg 304 that is cabled and a first end 404 of the second leg 310 that is cabled. Turning to FIG. 11D, the insert aperture 1110 includes a first cavity 1114 that is configured to receive the first end 402 of the first leg 304 and a second cavity 1116 that is configured to receive the first end 404 of the second leg 310. In the shown example, an inner sidewall 1118 of the insert 1108 defines the insert aperture 1110. Various arrangements of the first cavity 1114 and the second cavity 1116 are contemplated, including the first cavity 1114 and the second cavity 1116 being parallel to each other. In an example, the inner sidewall 1118 passes through a circumference 1122 of the insert 1108 such that the inner sidewall 1118 definition of the first cavity 1114 and the second cavity 1116 do not form complete borders for the first cavity 1114 and the second cavity 1116.

Figure 11E:
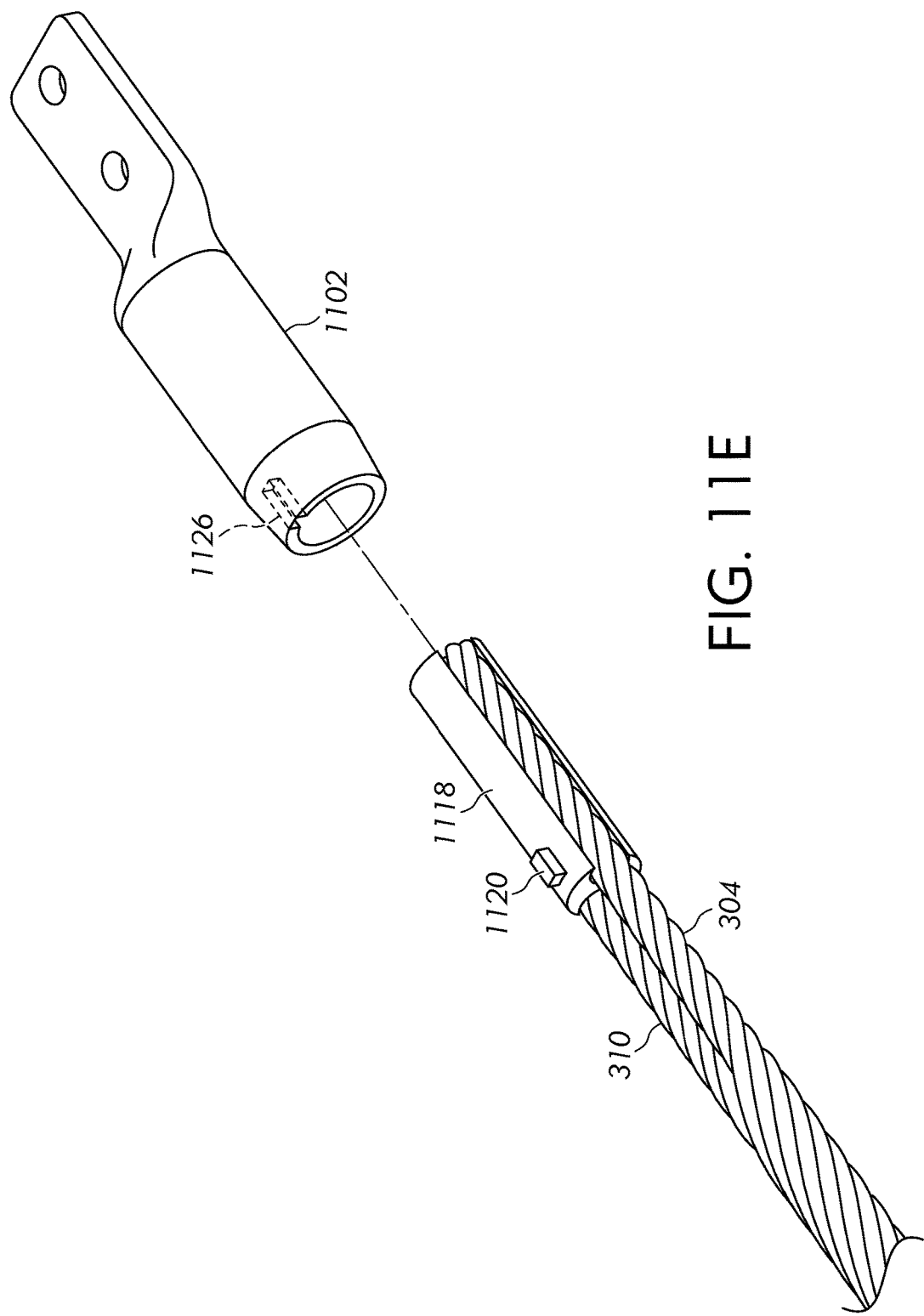
FIG. 11E is an illustration of an example helical jumper connector.

Turning to FIG. 11E, in an example, the insert 1108 can be clocked with respect to the jumper casting 1102 such that the insert 1108 can be received into the aperture 1104 in a desired orientation. In other words, the insert 1108 is clocked such that the insert 1108 is fixed at a first orientation relative to the jumper casting 1102 upon being received into the jumper casting 1102. For example, it may be beneficial in some circumstances to have the first leg 304 and the second leg 310 be in a certain orientation (e.g., side-by-side rather than one on top of the other) when the helical jumper connector 106 is attached to another structure or piece of equipment. Any suitable clocking means are satisfactory including, but not limited to, non-circular exterior perimeters of the insert 1108 being received within a non-cylindrical aperture 1104, a tab 1120 cooperating with a slot 1126 (shown in dashed lines) when the insert 1108 is received within the aperture 1104, etc.

Turning to FIG. 12, an example of a helical jumper connector 106 is illustrated. In this example, the helical jumper connector 106 includes a helical support member 302 having a first end 1202 comprised of a cabled portion 702 combining the strands 316 of the first leg 304 and the second leg 310. This example of the cabled portion 702 includes a third axial opening 1204. The cabled portion 702 of the helical support member 302 is wrapped around a slug 1206 to define a composite 1208. As with the example illustrated in FIG. 11, the jumper casting 1102 defines aperture 1104 at the first casting end 1106, and the aperture 1104 is configured to receive the composite 1208.

Figure 13:
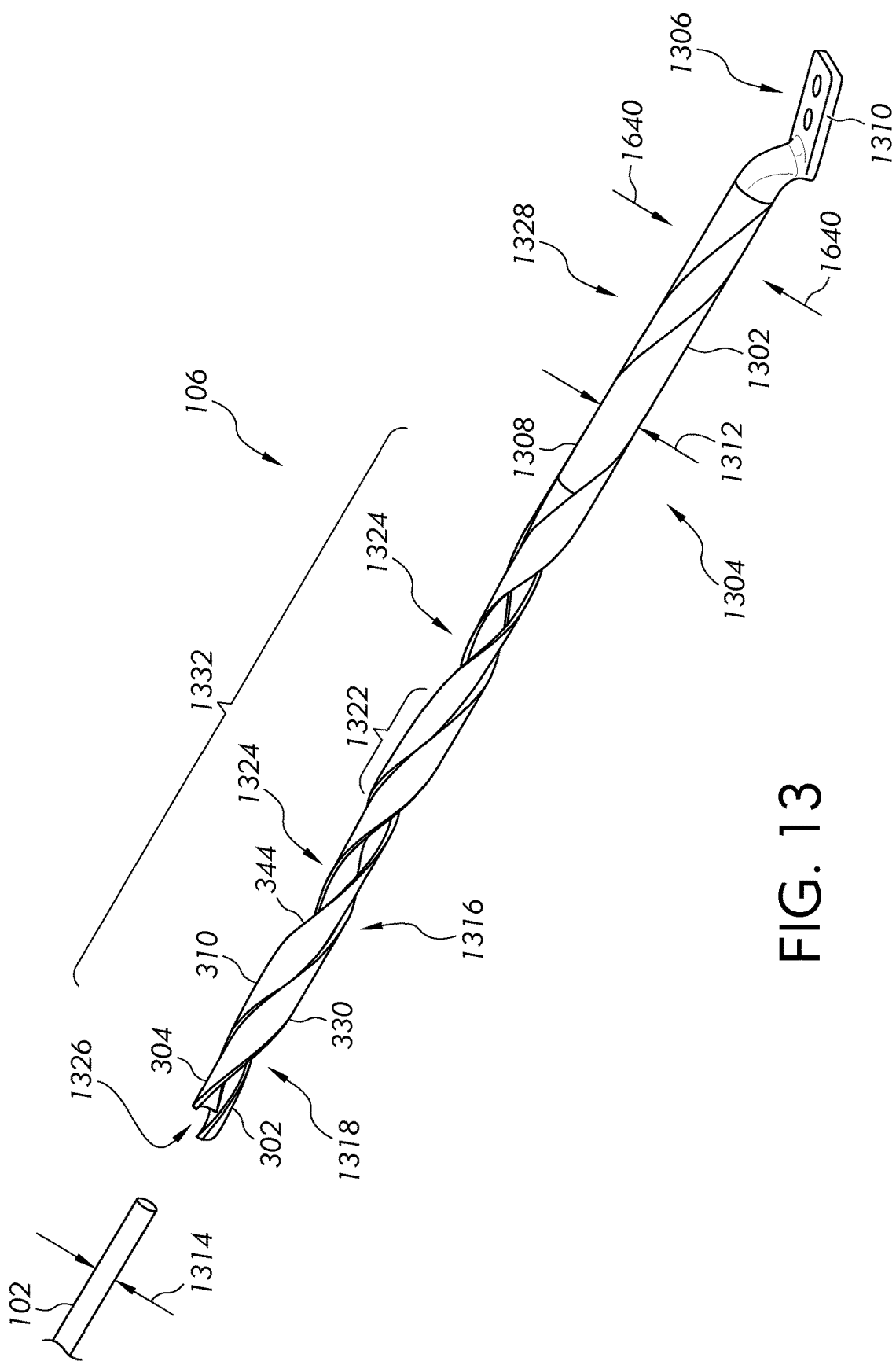
FIG. 13 is an illustration of an example helical jumper connector.

Turning to FIG. 13, an example of a helical jumper connector 106 is illustrated, where a jumper casting is configured to receive a helical support member. The shown example includes a jumper casting 1302 extending between a first casting end 1304 and a second casting end 1306. The first casting end 1304 includes a rod structure 1308 that is attached to the second casting end 1306 having a flange structure 1310 that is similar to earlier described flanges. In this example, the rod structure 1308 has an outside diameter 1312 that is similar to or equal to a diameter 1314 of the wire 102. Additionally, the helical support member 302 does not include a cabled portion. Instead, the first leg 304 and the second leg 310 can be wound together in an alternative manner. Here, the first helical winds 330 of the first leg 304 are adjacent on a first side 1316 to the second helical winds 344 of the second leg 310. However, on a second side 1318 of the first helical winds 330, there is a space between the first helical winds 330 and the next set of second helical winds 344. In other words, the first helical winds 330 are combined with the second helical winds 344 such that they are adjacent with each other to form a winding pair 1322 such that each winding pair 1322 is separated by the spaces 1324 between neighboring winding pairs 1322. The jumper casting thus 'receives' the helical support member by having one or more legs of the helical support member wound around at least some of the jumper casting.

Also in this example, the first helical winds 330 and the second helical winds 344 of the first leg 304 and the second leg 310 are wound to form an axial opening 1326 within a substantial length of the helical support member 302. During an assembly process, the first end 1328 of the helical support member 302 is received by the jumper casting 1302 (e.g., wound around the rod structure 1308 and the remaining length 1332 of the helical support member 302 extends away from the jumper casting 1302 and is wound around the wire 102. In an example, a portion of the jumper casting 1302 and the helical support member 302 may be compressed together, however, this is not necessary.

Figure 14:
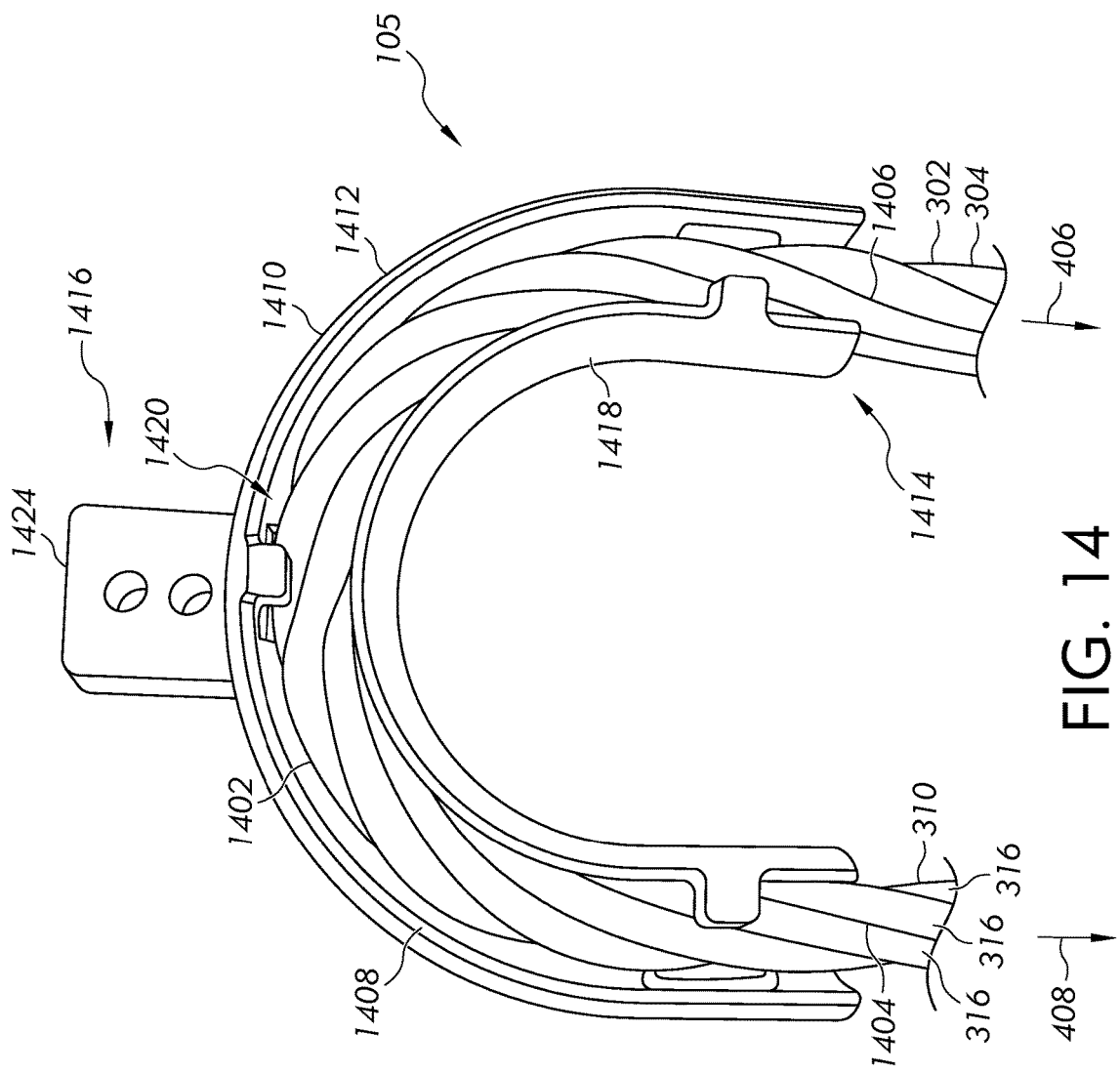
FIG. 14 is an illustration of an example helical jumper connector.

Turning to FIG. 14, an example of a helical jumper connector 106 is illustrated, where a jumper casting is configured to receive a helical support member. In this example, the strands 316 of the helical support member 302 extend from the second end 406 of the first leg 304 through the second end 408 of the second leg 310. The first leg 304 is connected to the second leg 310 through a first support portion 1402. The first support portion 1402 may extend along a non-linear axis between a first end 1404 and a second end 1406. In an example, the first support portion 1402 is a non-linear portion and comprises a bend 1408 located between the first end 1404 and the second end 1406.

In the illustrated example of FIG. 14, a jumper casting 1410 may grip the bend 1408. Due to the bend 1408 and the non-linear shape, the jumper casting 1410 may have a U-shape 1412. As with the jumper castings previously described, the jumper casting 1410 of FIG. 14 extends between a first casting end 1414 and a second casting end 1416. The first casting end 1414 includes a non-linear segment (e.g., U-shape 1412) having a sidewall 1418 defining a recess 1420 configured to receive a non-linear portion (e.g., bend 1408) of the helical support member 302. As with previous examples of the jumper casting, the second casting end 1416 of the jumper casting 1410 includes a flange structure 1424 configured to mount the helical jumper connector 106 to another helical jumper connector or other mounting structures or a piece of electrical equipment. In an example, a portion of the jumper casting 1410 and the helical support member 302 may be compressed together, however, this is not necessary. It will be appreciated that other embodiments are contemplated and that the example illustrated in FIG. 14 is not be interpreted in a strict, limiting, etc. manner, and that the same is true for other embodiments/ examples illustrated in other FIGS. For example, although the jumper casting 1410 illustrated in FIG. 14 is open such that the portion of the helical support member 302 received by the jumper casting 1410 (e.g., first support portion 1402) is visible or exposed, a lid, cover, etc., might be included such that the at least some of the helical support member 302 (e.g., first support portion 1402) might be enclosed by the jumper casting 1410 upon being received by the jumper casting 1410.

Figure 15:
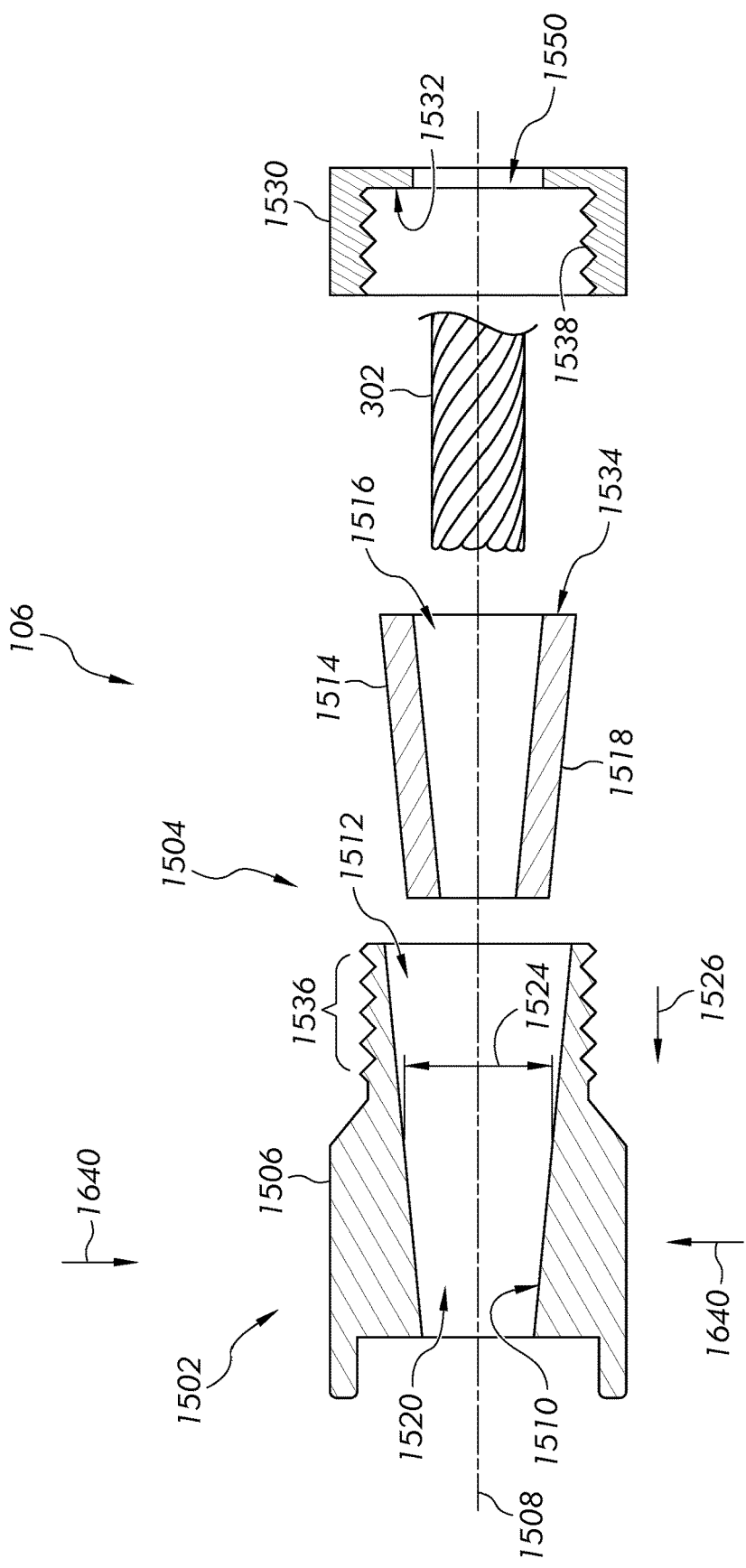
FIG. 15 is an illustration of an example helical jumper connector.

Turning to FIG. 15, an example helical jumper connector 106 is illustrated in cross-section. In this example, the jumper casting 1502 includes a wedge clamp 1504. The wedge clamp 1504 has a central body 1506 extending along a central axis 1508. An interior wall 1510 defines a conical clamp aperture 1512. Within the conical clamp aperture 1512, a wedge portion 1514 engages the interior wall 1510. The wedge portion 1514 may include several sections arranged circumferentially that work cooperatively. Additionally, the wedge portion(s) 1514 define a central aperture 1516 that is configured to receive the helical support member 302. As can be appreciated from FIG. 15, the wedge portion(s) 1514 include an inclined surface 1518, and when a force urging the wedge portion(s) 1514 toward a space 1520 in the conical clamp aperture 1512, the central aperture 1516 is reduced in diameter 1524. The described movement is in the direction of arrow 1526. This reduction in diameter 1524 is due to the fact that parts of the wedge portion(s) 1514 having greater thickness are being urged toward the space 1520 that has a lesser diameter. As a result of such motion in the wedge portion(s) 1514, the helical support member 302 is compressed within the wedge clamp 1504.

In order to urge the wedge portion(s) 1514 along the central axis 1508, the helical jumper connector 106 includes a cap 1530. A surface 1532 of the cap 1530 is configured to contact a surface 1534 of the wedge portion(s) 1514 to urge the wedge portions along the central axis 1508 toward space 1520 as the cap is moved onto the central body 1506. Movement of the wedge portion(s) 1514 encourage the wedge portion(s) 1514 to engage the interior wall 1510 and then compress the helical support member 302 as the wedge portion(s) 1514 continue moving toward the space 1520. Any suitable form of interaction between the cap 1530 and the central body 1506 is acceptable. In the shown example, the central body 1506 includes a body threaded portion 1536 and the cap 1530 includes a cap threaded portion 1538 configured to cooperate with the body threaded portion 1536 to urge the wedge portion(s) 1514 along the central axis 1508 as the cap 1530 is threaded onto the central body 1506. The cap 1530 can define a cap aperture 1550 that enables the helical support member 302 to pass through the cap 1530.

Turning to FIG. 16, the following paragraphs will now discuss a method of making a helical jumper connector assembly. The method includes providing a helical jumper connector represented by reference numeral 1610. The helical jumper connector includes a helical support member configured to support a wire. The helical support member includes a first leg having a first helical winding that defines a first axial opening. The helical support member also includes a second leg having a second helical winding that defines a second axial opening. The first axial opening and the second axial opening are coaxial with the wire when the first helical winding and the second helical winding are wrapped around the wire and cooperatively engage with one another to support the wire. The helical jumper connector also includes a jumper casting configured to receive the helical support member. The helical support member is electrically conductive and the jumper casting is electrically conductive such that the helical jumper connector forms an electrically conductive pathway to carry electrical current from the wire.

The method further includes orienting the jumper casting to receive the helical support member as represented by reference numeral 1620. The method still further includes applying a compression force to the helical jumper connector to establish a helical jumper connector assembly as represented by reference numeral 1630. In several examples, the compression force is applied in a radial fashion as represented by arrows 1640 in FIGS. 9, 11A, 12, 13, and 15. The described compression force is significant and compresses the jumper casting and the helical support member together such that significant force would be required to remove the helical support member from the jumper casting. This compression action secures the helical support member to the jumper casting to make them a complete unit (e.g., a completed helical jumper connector assembly). In some examples, the helical support member and the jumper casting come together to form a solid block while filling in any gaps or spaces within the helical support member itself; or between the helical support member, the insert, and the jumper casting; or gaps or spaces between the helical support member, the slug, and the jumper casting. Regardless of whether the helical support member and the jumper casting become a solid block, the helical support member, after compression, is able to withstand the rigors of supporting a conducting wire above the ground without the helical support member and the jumper casting separating.

The described compression force can be completed under factory controlled conditions. After the helical support member is received by the jumper casting, an appropriately configured compression die is fitted to the assembled helical support member and the jumper casting. For example, if the jumper casting includes an hourglass-shaped exterior, the compression die is machined to fit the hourglass jumper casting shape. Similarly, jumper castings having a cylindrical exterior shape will be compressed with a cylindrical compression die. The compression die is then used to compress the casting into contact with the helical support member. In the case of there being two first ends of the helical support member received by the jumper casting, the compression die can simultaneously compress both ends with the jumper casting. This compression acts to secure the legs to the jumper casting, making them one complete unit. Once assembled, this design can function similarly to other helical deadend products.

During some examples of the method of making a helical jumper connector assembly, applying the compression force increases an amount of surface to surface contact between the helical support member and the jumper casting. This can be beneficial to the assembly for at least two reasons. First, the increased surface to surface contact increases the strength of the assembly to reduce the likelihood of separation of the helical support member and the jumper casting. Second, the surface to surface contact serves to promote electrical conductivity between the helical support member and the jumper casting. In some examples, full electrical conductivity (100% conduction) takes place between the helical support member and the jumper casting.

A further example of the method of making a helical jumper connector assembly includes an operation, prior to applying the compression force, of rotating the first leg relative to the second leg such that the first leg is fixed at a first orientation relative to the second leg. This can be beneficial so that after the compression operation is complete, the first leg and the second leg of the helical support member can cooperate such that the first spaces of the first leg align with the second winds of the second leg. In this way, the first leg and the second leg can more easily wrap around the wire. As such, the first axial opening and the second axial opening are coaxial with the wire when the first helical winding and the second helical winding are wrapped around the wire and cooperatively engage with one another to support the wire. This enables the first leg and the second leg to adequately support the wire after it is placed on a supporting structure in the field.

In an example of the method of making a helical jumper connector assembly an operation of placing an insert within the aperture defined by the jumper casting. As previously described, the insert defines an insert aperture configured to receive the helical support member. The method can include another operation of placing the helical support member within the insert aperture. Each of these operations can occur prior to the operation of applying a compression force.

The described apparatus and methods can include numerous benefits. For example, the helical jumper connector can be sold as a pre-assembled unit that is ready for field installation. This can enable rapid and consistent assembly of these helical jumper connectors by line workers. Once in the field, a line worker can simply wrap the helical first leg and helical second leg extending from the first casting end of the helical jumper connector assembly onto a jumper wire to complete the install. This can save field install time while also giving much more reliable connections that will not be as susceptible to corrosion or loosening after several years of field use. Completing the compression/assembly operation in-house under controlled conditions can help to create more reliable connections that are easily repeatable than field installed compression fittings. Because of the controlled conditions of compressing the helical support member, the uniform compression can lead to reduced frequency of concentrated stresses within the helical jumper connector during the expected lifetime of the helical jumper connector. Another benefit can include the fact that line workers will no longer be required to work with relatively slow, bulky, and sometimes inconsistent hydraulic compression equipment. The installation may be the same as applying other common line hardware so no additional lineman training will be required to install these fittings. As such, the described apparatus and methods can be simpler and more reliable than previously known wire support structures.

Other benefits can include use on any application in which a connector is being connected to stranded wire. The described apparatus and methods could be used in these situations. Examples include a powerline jumper connector or connecting a hook or other end fitting to a wire rope. The described apparatus and methods can be used in place of cable clamps, soldering, welding, wedge type grips and many other types of wire end-terminal connection methods.

Other benefits can include the positive effects of wrapping the conductor (e.g., the wire) rather than compressing it in a fitting. One of these positive effects can be a stiffening effect on the wire as the first leg and the second leg are wrapped around the wire at field assembly. This stiffening effect can help reduce fragility at the cut end of the wire. Another positive effect can be a reduction of undesired stress in and on the wire resulting from the wrapping grip rather than the compression fitting. Yet another positive effect can be a reduction in the frequency of breakage of the conductor (e.g., the wire).

Still additional benefits of the described apparatus and methods can include reduced effort to replace the connector in the field after the expected useful life of the connector or a failure in the field. Additionally, some previous connectors used jumpers that required three wire terminations that were potential failure points. The described apparatus and methods promote the use of one wire termination point.

The purpose of the disclosed apparatus and methods is to simplify the field installation of jumper wire end fittings. Most of the current connectors rely on a compression design where an aluminum sleeve is compressed or crimped onto a conductor end using mechanical force applied at the installation site in the field. This compression can be accomplished using simple hand compression devices similar to a large pair of pliers or it can be done using a complex hydraulic compression machine to generate the high clamping forces required for a secure connection. These devices are bulky and time consuming to use in the field. It can also be difficult to ensure consistent compression splices due to the variable conditions one may experience while working with these tools in the field. The present disclosure enables the compression aspect to be performed under controlled factory conditions and simplify the field installation to the extent that ideally no tools would be required for field installations.

The new design comprises of a preassembled jumper connector with helically formed wires at the conductor-jumper interface. The helical wires simplify installation by allowing the jumper connector to be attached to the conductor by simply wrapping the helical wires onto it. By bringing the compression aspect of the connection in-house, we will be able to make much more consistent and secure connections while at the same time simplifying field installations for line workers.

The foregoing outlines features of several embodiments so that those of ordinary skill in the art may better understand various aspects of the present disclosure. Those of ordinary skill in the art should appreciate that they may readily use the present disclosure as a basis for designing or modifying other processes and structures for carrying out the same purposes and/or achieving the same advantages of various embodiments introduced herein. Those of ordinary skill in the art should also realize that such equivalent constructions do not depart from the spirit and scope of the present disclosure, and that they may make various changes, substitutions, and alterations herein without departing from the spirit and scope of the present disclosure.

Although the subject matter has been described in language specific to structural features or methodological acts, it is to be understood that the subject matter of the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

It will be appreciated that layers, features, elements, etc. depicted herein are illustrated with particular dimensions relative to one another, such as structural dimensions or orientations, for example, for purposes of simplicity and ease of understanding and that actual dimensions of the same differ substantially from that illustrated herein, in some embodiments.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application and the appended claims are generally be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used, such terms are intended to be inclusive in a manner similar to the term "comprising". Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others of ordinary skill in the art based upon a reading and understanding of this specification and the annexed drawings. The disclosure comprises all such modifications and alterations and is limited only by the scope of the following claims. In particular regard to the various functions performed by the above described features (e.g., elements, resources, etc.), the terms used to describe such features are intended to correspond, unless otherwise indicated, to any features which performs the specified function of the described features (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A helical jumper connector comprising:
a helical support member configured to support a wire, the helical support member comprising:
a first leg having a first helical winding that defines a first axial opening; and
a second leg having a second helical winding that defines a second axial opening, wherein the first axial opening and the second axial opening are coaxial with the wire when the first helical winding and the second helical winding are wrapped around the wire and cooperatively engage with one another to support the wire; and
a jumper casting configured to receive the helical support member, wherein the helical support member is electrically conductive and the jumper casting is electrically conductive such that the helical jumper connector forms an electrically conductive pathway to carry electrical current from the wire.

2. The helical jumper connector according to claim 1, wherein the jumper casting extends between a first casting end and a second casting end, and the second casting end is a mounting flange.

3. The helical jumper connector according to claim 1, wherein the first helical winding has a first inwardly facing surface, which faces towards the first axial opening, and a first outwardly facing surface, which faces away from the first axial opening, and the first inwardly facing surface has a coefficient of friction different than a coefficient of friction of the first outwardly facing surface.

4. The helical jumper connector according to claim 1, wherein a portion of the helical support member is cabled and the portion is received by the jumper casting.

5. The helical jumper connector according to claim 4, wherein the jumper casting defines an aperture configured to receive the portion.

6. The helical jumper connector according to claim 5, further comprising an insert, wherein the aperture defined by the jumper casting is configured to receive the insert, and the insert defines an insert aperture configured to receive the portion.

7. The helical jumper connector according to claim 6, wherein the portion comprises a first end of the first leg that is cabled and a first end of the second leg that is cabled, wherein the insert aperture includes a first cavity configured to receive the first end of the first leg and a second cavity configured to receive the first end of the second leg, wherein an inner sidewall of the insert defines the insert aperture.

8. The helical jumper connector according to claim 6, wherein the insert is clocked such that the insert is fixed at a first orientation relative to the jumper casting upon being received into the jumper casting.

9. The helical jumper connector according to claim 1, wherein a first end of the first leg is cabled and a first end of the second leg is cabled and the jumper casting defines an aperture that includes a first cavity configured to receive the first end of the first leg and a second cavity configured to receive the first end of the second leg.

10. The helical jumper connector according to claim 9, wherein an inner sidewall of the jumper casting defines the aperture.

11. The helical jumper connector according to claim 1, further comprising a slug, wherein a portion of the helical support member is wrapped around the slug to define a composite and the jumper casting defines an aperture configured to receive the composite.

12. The helical jumper connector according to claim 1, wherein the helical support member and the jumper casting are attached to one another through surface-to-surface contact to promote electrical conductivity between the helical support member and the jumper casting.

13. The helical jumper connector according to claim 1, the jumper casting comprising:
a wedge clamp comprising:
a central body extending along a central axis and having an interior wall defining a conical clamp aperture;
a wedge portion configured to engage the interior wall, the wedge portion defining a central aperture configured to receive the helical support member; and
a cap configured to urge the wedge portion along the central axis to encourage the wedge portion to engage the interior wall.

14. The helical jumper connector according to claim 13, wherein the central body includes a body threaded portion and the cap includes a cap threaded portion configured to cooperate with the body threaded portion to urge the wedge portion along the central axis.

15. The helical jumper connector according to claim 1, the jumper casting comprising:
a non-linear segment having a sidewall defining a recess configured to receive a non-linear portion of the helical support member.

16. The helical jumper connector according to claim 15, wherein the non-linear portion of the helical support member is between the first leg and the second leg.

17. A method of making a helical jumper connector assembly comprising:
providing a helical jumper connector comprising:
a helical support member configured to support a wire, the helical support member comprising:
a first leg having a first helical winding that defines a first axial opening; and
a second leg having a second helical winding that defines a second axial opening, wherein the first axial opening and the second axial opening are coaxial with the wire when the first helical winding and the second helical winding are wrapped around the wire and cooperatively engage with one another to support the wire; and
a jumper casting configured to receive the helical support member, wherein the helical support member is electrically conductive and the jumper casting is electrically conductive such that the helical jumper connector forms an electrically conductive pathway to carry electrical current from the wire;
orienting the jumper casting to receive the helical support member; and applying a compression force to the helical jumper connector after the helical support member is received by the jumper casting to establish a helical jumper connector assembly.

18. The method of making a helical jumper connector assembly according to claim 17, wherein applying the compression force increases an amount of surface to surface contact between the helical support member and the jumper casting.

19. The method of making a helical jumper connector assembly according to claim 17, comprising, prior to applying the compression force, rotating the first leg relative to the second leg such that the first leg is fixed at a first orientation relative to the second leg.

20. The method of making a helical jumper connector assembly according to claim 17, orienting the jumper casting comprising:
  placing an insert within an aperture defined by the jumper casting, wherein the insert defines an insert aperture configured to receive the helical support member, and
  placing the helical support member within the insert aperture.

\* \* \* \* \*